Sept. 30, 1969 P. E. GAUDRY ETAL 3,469,272
FLOOR AND RUG TREATING APPARATUS
Filed June 20, 1967 17 Sheets-Sheet INVENTORS
PAUL E. GAUDRY
EDOUARD GAUDRY
RAYMOND DESCARRIES
JAMES ANDERSON
BY
THEIR ATTORNEYS Sept. 30, 1969 P. E. GAUDRY ET AL 3,469,272
FLOOR AND RUG TREATING APPARATUS
Filed June 20, 1967 17 Sheets-Sheet 6
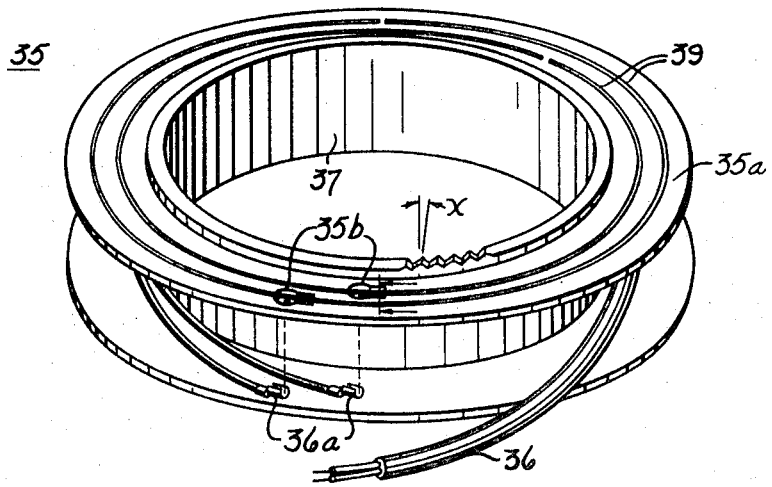
Fig. 11
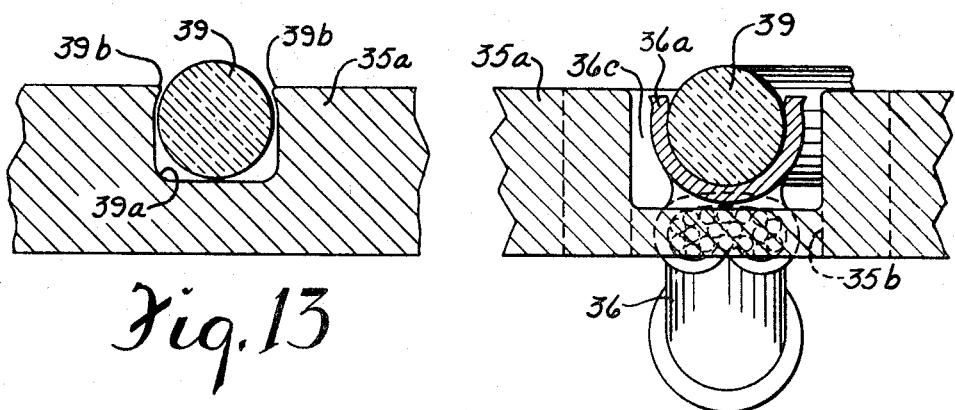
Fig. 13
Fig. 12
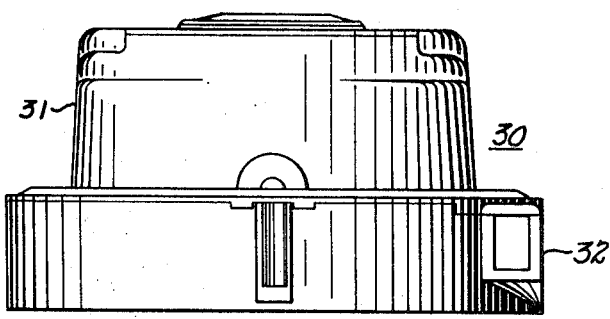
Fig. 20
INVENTORS
PAUL E. GAUDRY
EDOUARD GAUDRY
RAYMOND DESCARRIE
JAMES ANDERSON
BY Thomas C. Betts
William S. Henry
THEIR ATTORNEYS Sept. 30, 1969　　　P. E. GAUDRY ETAL　　　3,469,272
FLOOR AND RUG TREATING APPARATUS
Filed June 20, 1967　　　　　　　　　　　　17 Sheets-Sheet 8

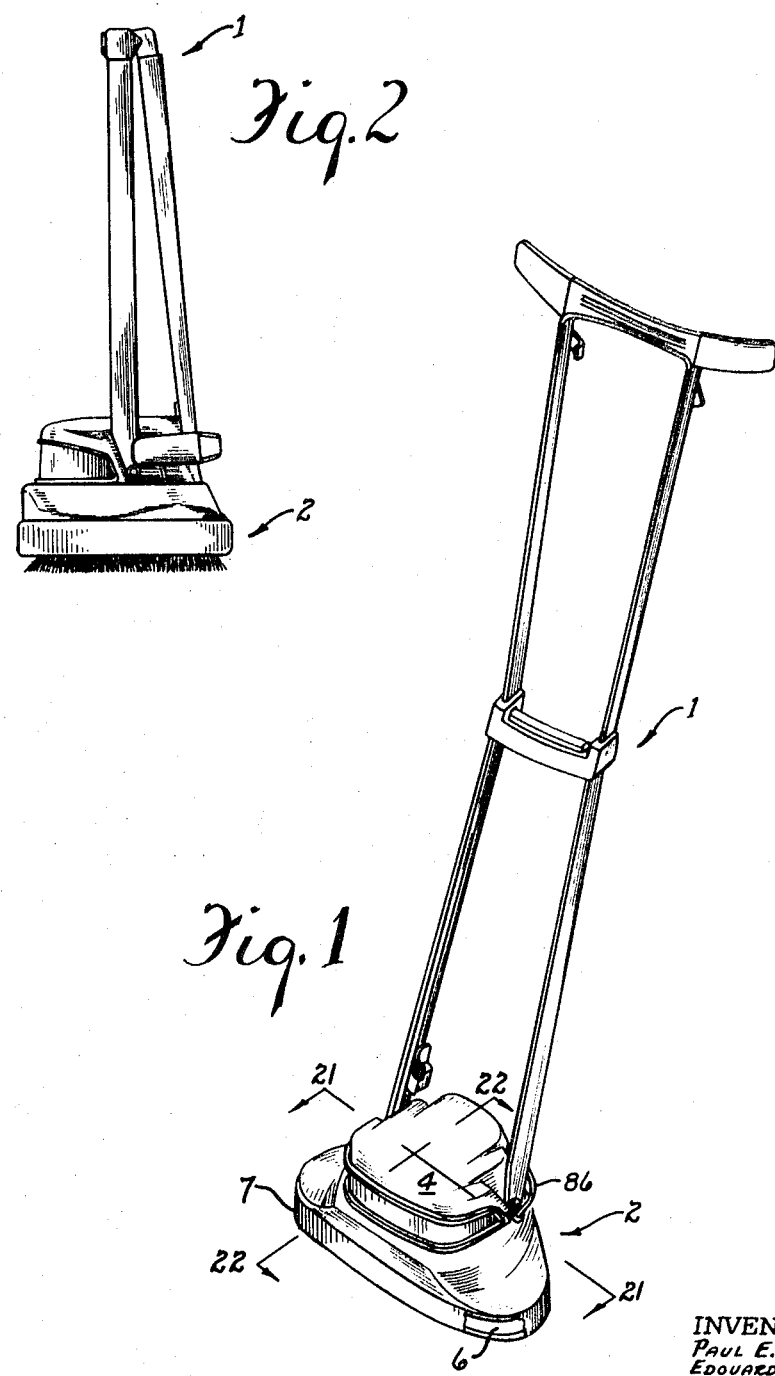

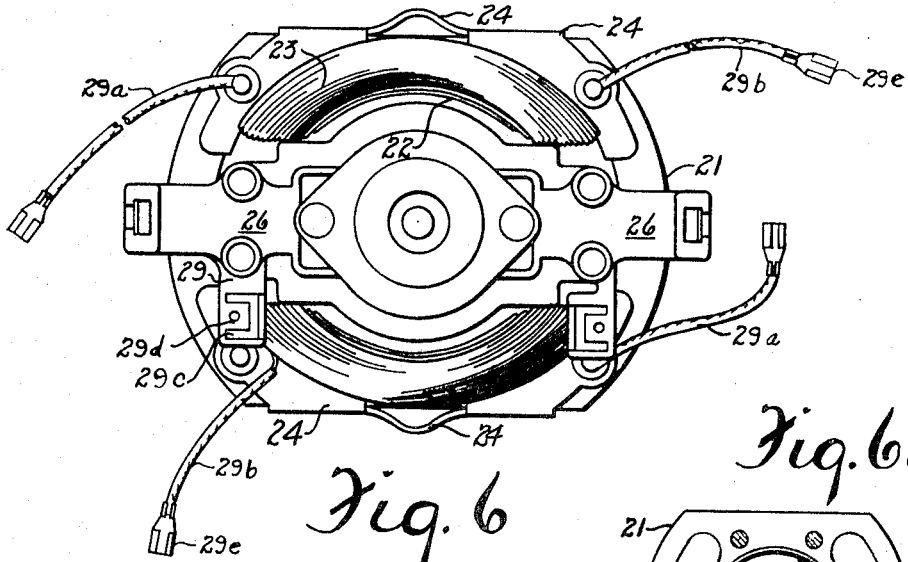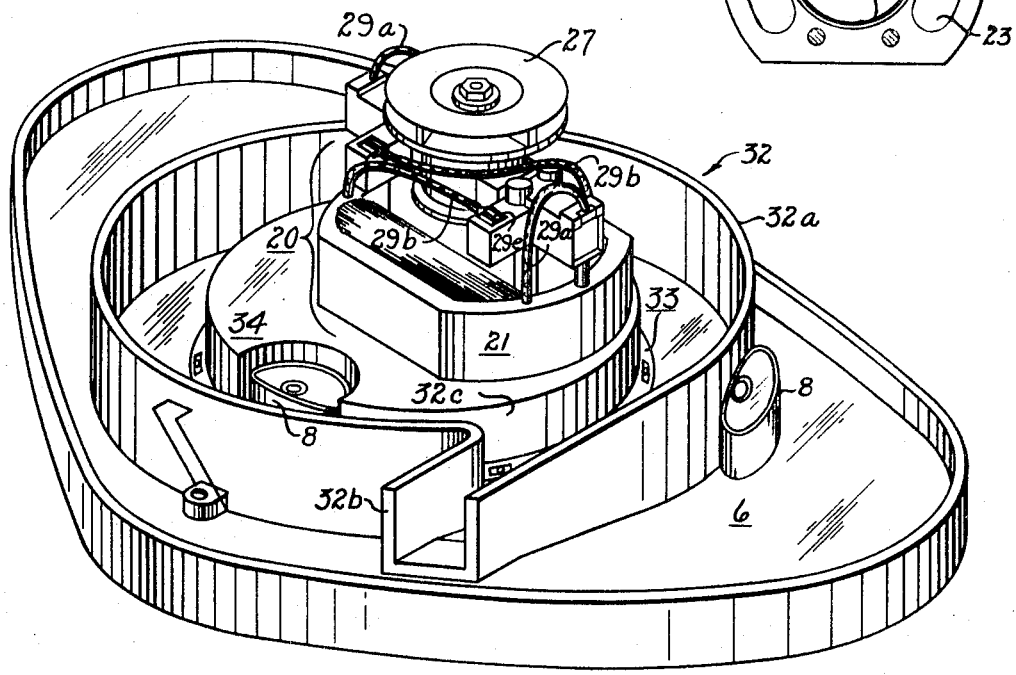

INVENTORS
PAUL E. GAUDRY
EDOUARD GAUDRY
RAYMOND DESCARRIES
JAMES ANDERSON
BY Thomas C. Beth
William S. Henry
THEIR ATTORNEYS Sept. 30, 1969  P. E. GAUDRY ETAL  3,469,272
FLOOR AND RUG TREATING APPARATUS
Filed June 20, 1967  17 Sheets-Sheet 2

INVENTORS
PAUL E. GAUDRY
EDOUARD GAUDRY
RAYMOND DESCARRIES
JAMES ANDERSON

BY Thomas C. Bitts
William S. Henry
THEIR ATTORNEYS

Sept. 30, 1969 P. E. GAUDRY ETAL 3,469,272
FLOOR AND RUG TREATING APPARATUS
Filed June 20, 1967 17 Sheets-Sheet 10
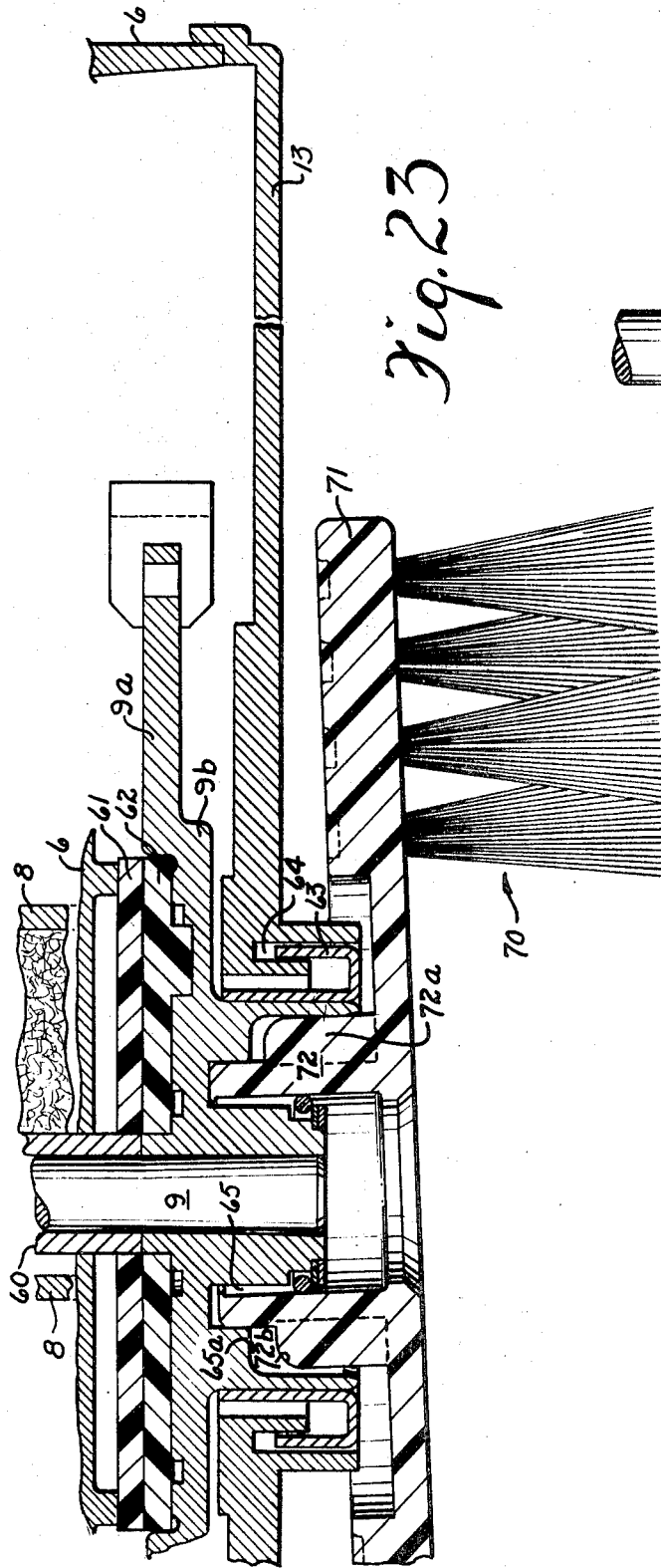
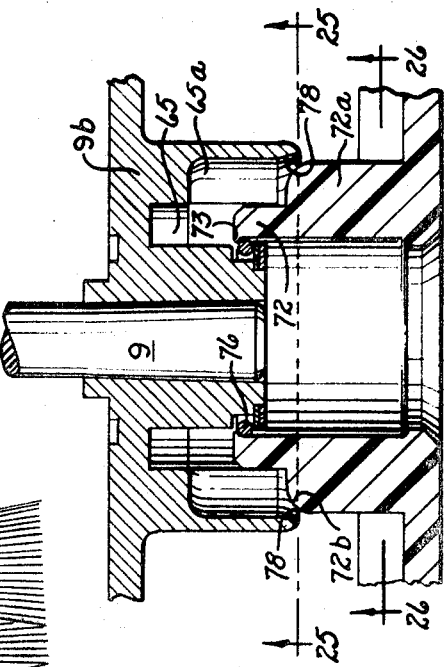
INVENTORS
PAUL E. GAUDRY
EDOUARD GAUDRY
RAYMOND DESCARRIES
JAMES ANDERSON
BY Thomas C. Betts
William L. Henry
THEIR ATTORNEYS Sept. 30, 1969　　　P. E. GAUDRY ET AL　　　3,469,272
FLOOR AND RUG TREATING APPARATUS
Filed June 20, 1967　　　　　　　　　　　　　17 Sheets-Sheet 11

INVENTORS
PAUL E. GAUDRY
EDOUARD GAUDRY
RAYMOND DESCARRIES
JAMES ANDERSON

BY
THEIR ATTORNEYS

Sept. 30, 1969  P. E. GAUDRY ETAL  3,469,272
FLOOR AND RUG TREATING APPARATUS
Filed June 20, 1967  17 Sheets-Sheet 12

INVENTORS
PAUL E. GAUDRY
EDOUARD GAUDRY
RAYMOND DESCARRIES
JAMES ANDERSON
BY
THEIR ATTORNEYS

Sept. 30, 1969     P. E. GAUDRY ET AL     3,469,272
FLOOR AND RUG TREATING APPARATUS
Filed June 20, 1967     17 Sheets-Sheet 13
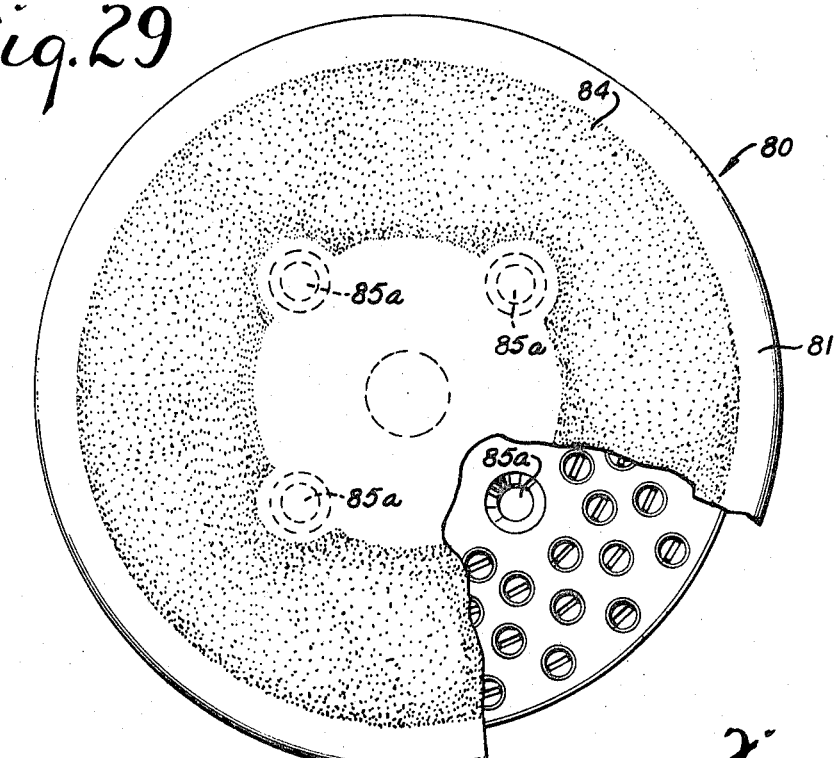
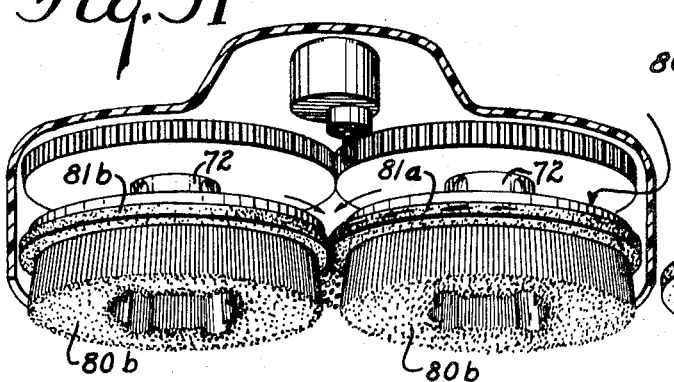
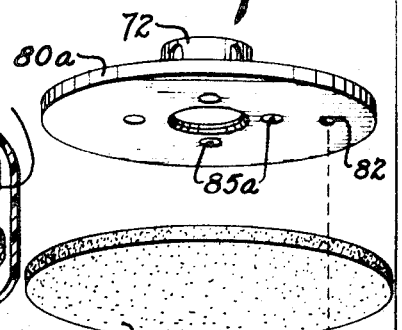
INVENTORS
PAUL E. GAUDRY
EDOUARD GAUDRY
RAYMOND DESCARRIES
JAMES ANDERSON
BY Thomas E. Betts
William S. Henry
THEIR ATTORNEYS

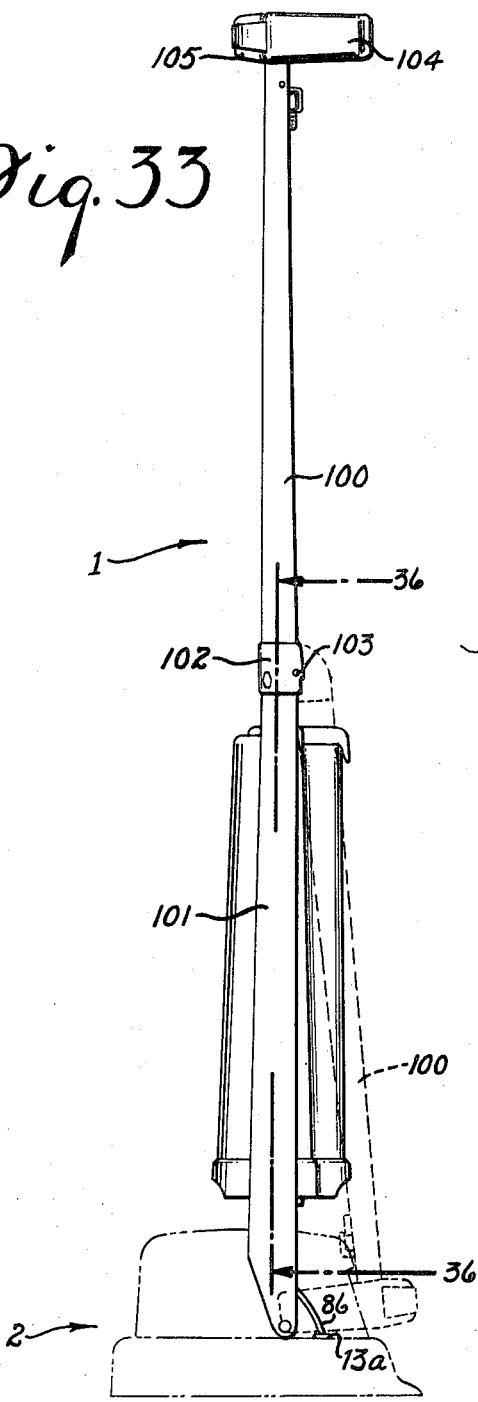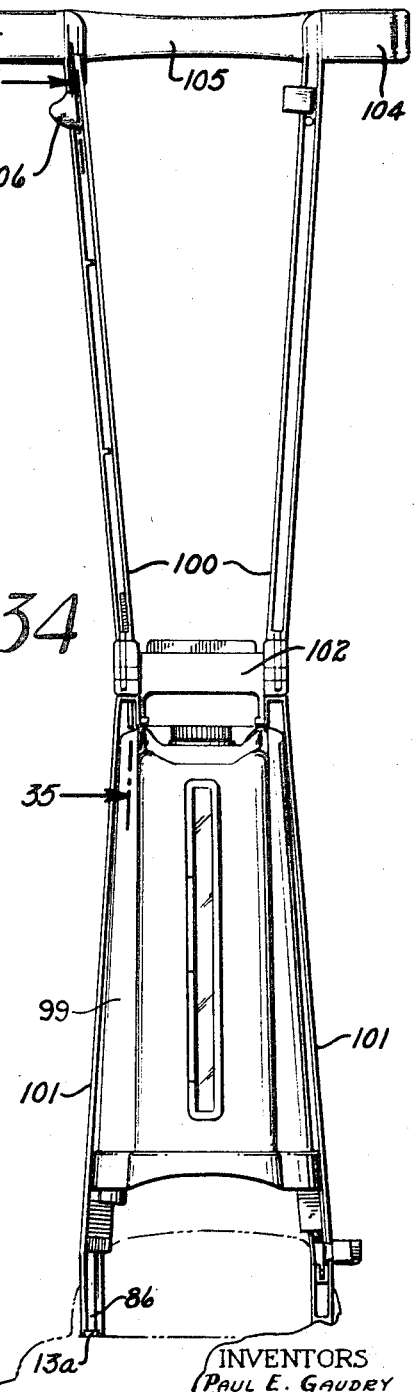

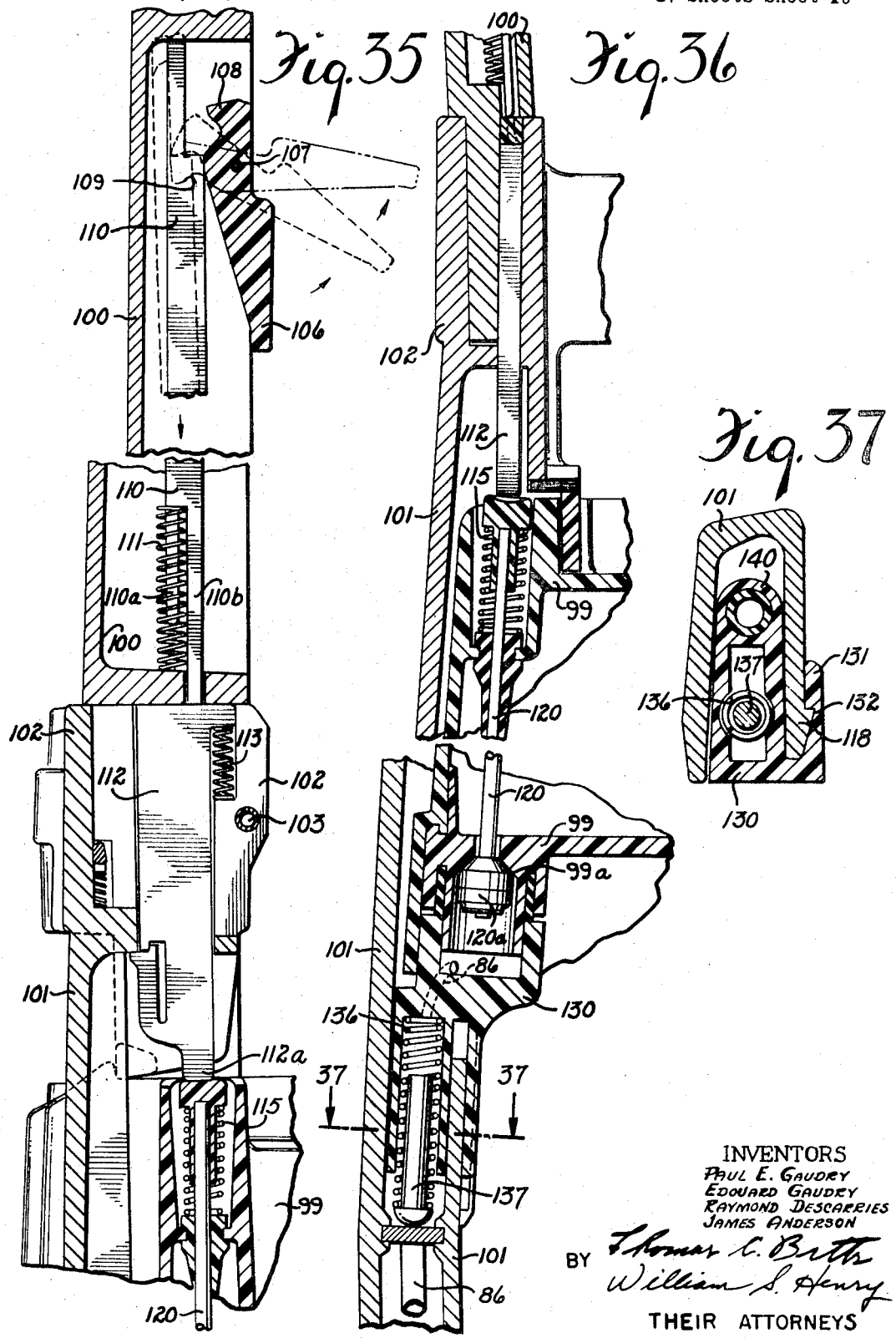

Sept. 30, 1969   P. E. GAUDRY ET AL   3,469,272
FLOOR AND RUG TREATING APPARATUS
Filed June 20, 1967   17 Sheets-Sheet 16

INVENTORS
PAUL E. GOUDRY
EDOUARD GAUDRY
RAYMOND DESCARRIES
JAMES ANDERSON

BY
THEIR ATTORNEYS

INVENTORS
PAUL E. GAUDRY
EDOUARD GAUDRY
RAYMOND DESCARRIES
JAMES ANDERSON

BY

THEIR ATTORNEYS

3,469,272
FLOOR AND RUG TREATING APPARATUS
Paul E. Gaudry, Laval des Rapides, Quebec, Edouard Gaudry, Cite St. Laurent, Quebec, Raymond Descarries, Montreal, Quebec, and James Anderson, Baie d'Urfe, Quebec, Canada, assignors to Electrolux Corporation, Fairfield, Conn., a corporation of Delaware
Filed June 20, 1967, Ser. No. 647,378
Int. Cl. A47l 11/14, 11/34
U.S. Cl. 15—50                                    23 Claims

ABSTRACT OF THE DISCLOSURE

A combined floor polisher-rug scrubber of unitized and integrated construction to facilitate assembly during manufacture and parts replacement for repair by unskilled persons including a motor having readily removable and replaceably stator and rotor ball bearings, and brush block assembly; readily assembled and disassembled parts including a ball bearing having an easily manufactured, inexpensive ball retainer; a skew axis gear train for the spring motor which drives the cordwinder reel to wind-up or reel-in a cord; electric circuit components which automatically couple the motor and cordwinder cord during manufacturing assembly and disassembly and replacement for repair, and including a weighted switch to prevent accidental operation of the machine when an operator is changing the cleaning brushes; a cam action latch to facilitate removal of brushes from the associated driving spindle; rug scrubbing brush having a foam generating sponge material disc to prevent wetting the rug backing which causes staining; a thrust bearing for a floor polisher having one disc of "nylon" material and a juxtapositioned disc of "Delrin" material combined with a sintered bronze sleeve for feeding lubricant to the shaft of a brush and the interface between these discs for supporting the weight of the machine on a low friction bearing; labyrinth seals to prevent entry of wax and cleaning liquids into the motor and cordwinder compartment along the brush driving spindles projecting into the well or recess containing the cleaning brushes; an articulated handle having a spring biased bar for securely latching the handle sections in extended position and to facilitate carrying and storage of the machine when not in use, and a handle having a pair of spaced side rails provided with mounting pads for a shampoo container which is automatically connected with a shampoo discharge control lever integral with the handle to vary the dispensing valve on the separable container.

Background of the invention

The invention relates to a multi-brush combined floor polisher-rug scrubber machine of the type generally known from such U.S. Patents as 3,153,251, 3,186,022 and 3,275,760.

In the known apparatus to which this invention pertains manufacturing assembly and more particularly field repairs have been time consuming and expensive because skilled mechanics are required for this purpose and repairs could not be made at the residence of the owner.

Also the known floor polishers have not been entirely satisfactorily adapted for rug shampooing use because foam generating means, whereby a liquid shampoo is converted to foam, has not been adequate. That is, if a liquid shampoo for rug cleaning is not sufficiently agitated the liquid wets the rug backing. As the rug dries discoloring materials in the rug backing are drawn by capillary action to the exposed surface of the rug resulting in "browning" or staining.

The brush latching arrangement in the prior art machines have been satisfactory when the machines are new. However, after a period of use it is difficult to remove brushes from the associated spindles due to accumulated dirt and corrosion of the mated parts.

In the known machines, when the operator is changing brushes, without disconnecting the machine from the electric outlet, the machine can be turned "on" accidentally.

Further, the known machines for floor and/or rug cleaning have tended to be bulky and difficult to transport or store because the handle is not designed for easy carrying and for storage in a small space having a small head space.

The disadvantages mentioned above are substantially eliminated according to this invention and additional advantages and features are provided as will be apparent from the detailed description to follow.

Summary of the invention

This invention relates to an improved, combination floor polisher-rug scrubber having an integrated, unitized construction to facilitate manufacturing assembly and repair by relatively unskilled persons who can replace defective and worn parts in situ in a quick and simplified manner. To this end the motor of the machine is separately removably attached to a base member and comprises a replaceable rotor, stator and brush block sub-assembly. Also an integrated cordwinder assembly is also separately removably attached to the base so that it can be replaced in toto or by units.

The cordwinder assembly comprises a tray within which the cord reel or spool is housed on a replaceable ball bearing having a simplified and improved ball retainer. The tray also removably mounts the spring motor and a skew axis gear train for driving the cord reel to unwind or reel-in the electric cord for the machine.

Between the tray and motor stator, circuit components are provided which automatically electrically couple the electric cord and the stator when the machine is being assembled or when repaired in situ. These circuit components also include a weighted switch arrangement as a safety feature whereby the machine cannot be accidentally turned "on" when the operator is replacing brushes.

The brush latching arrangement according to the invention whereby a brush is removed from its drive spindle, is not adversely effected by dirt and corrosion since a brush is removed by a camming mechanism providing leverage between the driving lugs of a brush spindle and the hub of the associated brush when the brush is turned or twisted through a small angle.

According to the invention liquid shampoo is conducted to a rug scrubbing brush having a sponge-like element integral therewith whereby the liquid shampoo is effectively converted to foam to prevent wetting and the resultant staining. Further, due to the improved foam generation, a machine according to this invention is provided with labyrinth seals surrounding each brush spindle to prevent entry of foam into the motor compartment.

Since the machine weight is supported by the brush spindles, an improved thrust bearing is provided according to this invention which includes juxtapositioned thrust washers, one of which consists of "nylon" and the other of "Delrin," associated with a sintered bronze sleeve for supplying lubricant to the brush spindle shaft as well as to the interface between the thrust washers.

A further improvement over the prior art machines is provided by this invention by virtue of an articulated handle which is quickly and simply folded for conveniently carrying the machine and allowing it to be stored in an area having a small head space. The handle of the invention is locked in extended position by a spring biased camming bar which cooperates with a curved surface of a handle section to compensate for wear i.e. the handle is rigidly locked in its extended position regardless of wear. In addition the handle according to the invention is provided with means for removably mounting a shampoo tank in a simple and secure manner and a shampoo dispensing control lever is incorporated in the handle for operating the valve of the separable shampoo tank without the use of exposed chains as commonly found in the known machines.

In view of the above, one object of the invention is to provide a combined floor polisher-rug washer having an integrated, unitized construction to facilitate assembly during manufacture and quick and simple removal of parts for repair purposes.

Another object of the invention is to provide a floor polisher which is quickly and conveniently adapted for use as a rug scrubber with improved foam generating means.

Another object of the invention is to provide a floor polisher-rug scrubber which is less bulky in size and appearance than the known machines and which is provided with an articulated handle for readily carrying and storing the machine.

Another object of the invention is to provide safety features for a machine of the type noted so that the user can change brushes without accidentally turning the machine "on" while connected to a wall outlet.

Another object of the invention is to provide a cam arrangement for easily and quickly removing brushes from the associated spindles of a combination floor polisher-rug scrubber after prolonged periods of use.

Another object of the invention is to provide an improved cordwinder for floor polishers and other mobile electric machines having electric cords.

Another object of the invention is to provide a compact skew axis gear drive for a cordwinder.

Another object of the invention is to provide an inexpensive, replaceable ball retainer for a ball bearing.

Another object of the invention is to provide an improved thrust bearing for a floor polisher.

Another object of the invention is to provide automatically coupled circuit components for a unitized floor polisher.

The foregoing objects and other objects and features of the invention will become apparent from the following detailed description of a presently preferred embodiment of this invention.

Brief description of the drawing

FIG. 1 is a perspective view of a floor care machine according to the invention.

FIG. 2 is a side elevation of the machine illustrated in FIG. 1 with the handle shown in stowed position.

FIG. 6 is a top plan view of the motor unit shown in FIG. 5 illustrating certain details of construction and taken generally on line 6—6 of FIG. 5.

FIG. 6a is a view taken along line 6a, 6a of FIG. 5 on a reduced scale.

FIG. 7 is a perspective view of the assembled parts shown in FIG. 5 with the addition of a cordwinder tray according to the invention.

FIG. 11 is a perspective view of the cord reel per se as shown in FIG. 9.

FIGS. 12 and 13 are enlarged cross-sectional views illustrating details of construction of the cord reel shown in FIG. 11.

FIG. 20 (sheet 6) is an elevational view of the housing of the cordwinder unit as shown broken away in FIG. 14.

FIG. 23 is an enlarged detailed cross-sectional view relating to the brush mounting arrangement shown in FIG. 21.

FIG. 24 is a cross-sectional view of a portion of the arrangement shown in FIG. 23 showing a brush in another position.

FIG. 29 is a bottom plan view of the brush shown in FIG. 27 partly broken away.

FIG. 30 is a schematic exploded view illustrating the method of manufacturing a foaming brush according to the invention.

FIG. 31 is a schematic, partly cross-sectioned, perspective view of a polisher having a pair of foaming brushes according to the invention.

FIG. 32 is a schematic view of a three brush polisher as seen in FIG. 2 having foaming brushes and illustrating the foam generating action of a three brush arrangement.

FIG. 33 is a side elevation of the handle for a floor care machine according to the invention in greater detail than as shown in FIG. 1 and in addition showing a shampoo tank in combination.

FIG. 34 is a rear view of the handle and tank assembly shown in FIG. 33.

FIG. 35 is a detailed cross-sectional view taken along line 35, 35 in FIG. 34.

FIG. 36 is a detailed cross-sectional view taken along line 36, 36 in FIG. 33.

FIG. 37 is a cross-sectional view taken on line 37, 37 of FIG. 36.

Figure 3:
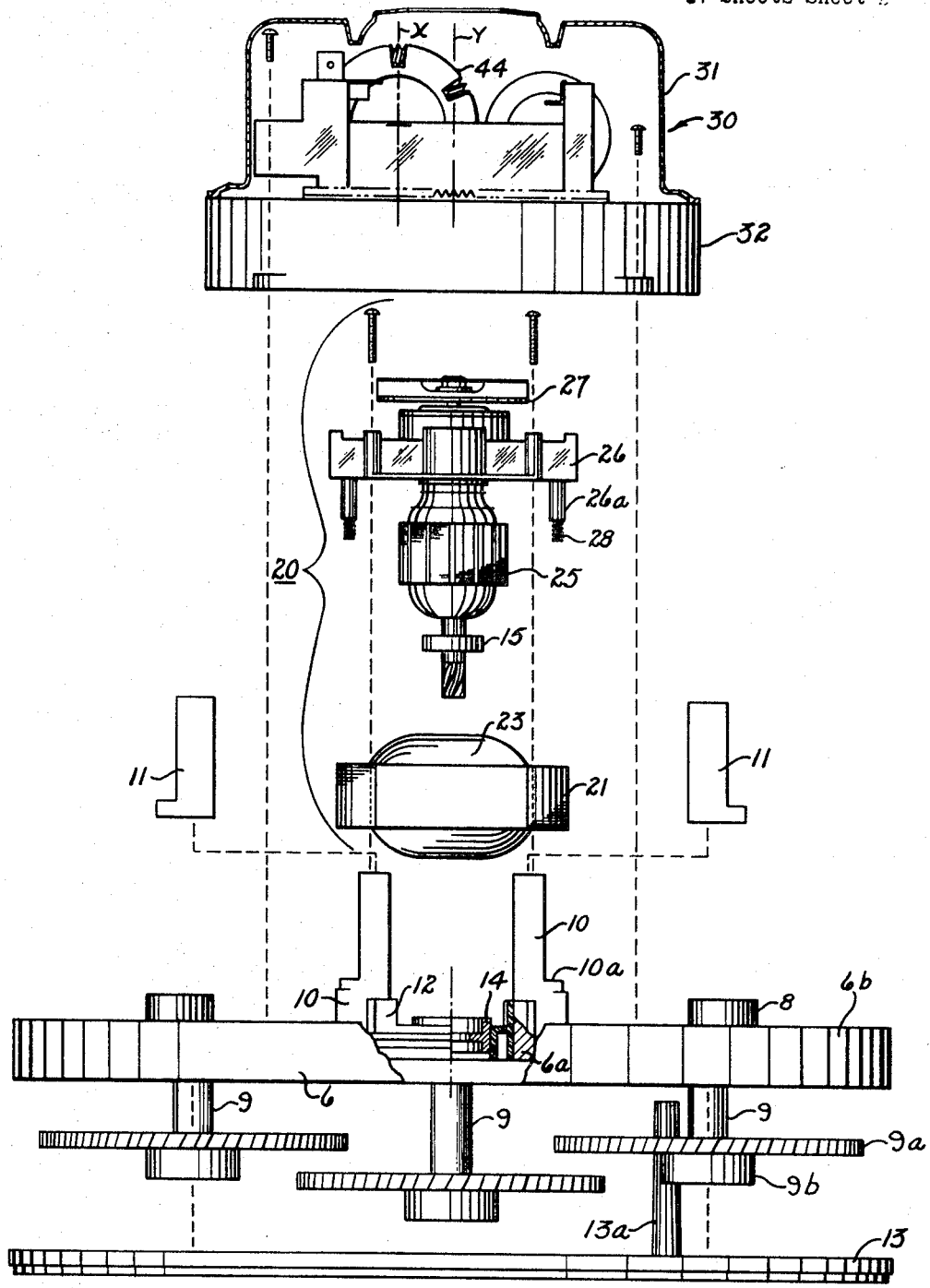
FIG. 3 is a schematic exploded view of the base unit of the machine shown in FIGS. 1 and 2 illustrating the facility with which the apparatus according to the invention is assembled during manufacture and units replaced for repair.

A floor care machine according to the invention illustrated in FIGS. 1 and 2, consists of a handle, generally designated 1 which is pivotally connected to a base portion generally designated 2. A shampoo tank is adapted to be removably attached to the handle, and as seen in FIGS. 33, 34 and the handle is articulated at the carrying yoke for carrying and stowage purposes. The outer housing of the base portion consists of a dome 4 attached to a hood 5 which is in turn attached to a base plate or casting 6. The handle is pivotally connected to the hood 5 in any suitable manner. A bumper skirt 7 of resilient material covers the base plate 6 and extends outwardly from the hood 5 to protect furniture from being marred by the machine. The handle 1 is provided with suitable fittings for holding an electric cord and associated plug in place on the handle (not shown).

Referring to FIGS. 3 to 6a, and in particular to the schematic exploded view of FIG. 3 which best illustrates the unitized construction of a floor care machine according to the invention, reference numeral 6 indicates a cast base plate of aluminum alloy or other suitable non-magnetic material having a web portion 6a and a peripheral flange 6b which extends above and below the web portion. A plurality of lubricant wells 8 are formed integral with the web of the base plate, and in this case there are three wells 8 one for each of the gear shafts 9 of gears 9a. In a two brush polisher there would be just two wells 8. Each gear 9a includes a brush spindle 9b, which projects through suitable openings in a protecting plate 13, to which the brushes are attached as will be disclosed in detail in connection with FIGS. 23 to 26. As is well known the gear shafts 9 extend through apertures in the web communicating with the interior of the wells 8. As will be described in connection with FIG. 23 a sintered bronze sleeve (not shown) within each of the wells 8 receives the shafts 9 and an absorbent material (not shown), saturated with lubricating oil, surrounds these sleeves. The wells are closed by a suitable cover 82.

Figure 4:
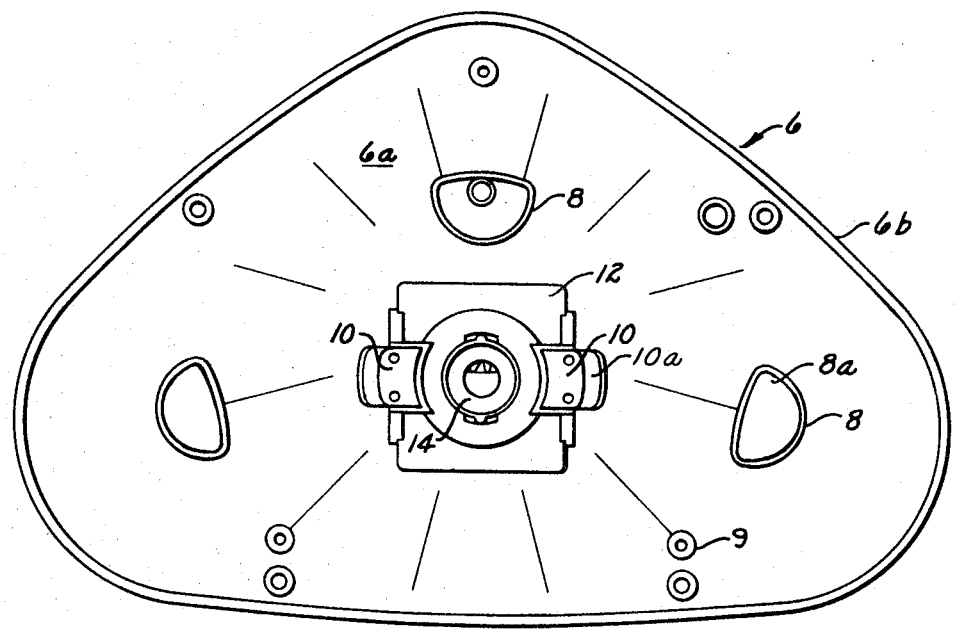
FIG. 4 is a plan view of the base plate upon which the various operating elements of the machine are mounted according to the invention.

A pair of upstanding posts 10 are also formed integral with the web of the base plate. Each post 10 has a shoulder 10a upon which the stator 21 rests in a position spaced above the web of the base plate. The stator 21 of the motor unit 20 consists of a stack of generally oval shaped laminations having a pair of opposed inwardly extending pole pieces 22 (FIGS. 6, 6a) about which the stator coils 23 are wound. A suitably shaped synthetic resin member 24 fits over the stator and its pole pieces for electrically insulating the coils 23 from the stator stack 21. The stator is shaped and dimensioned to fit sungly over the posts 10 (as best seen in FIG. 6a). A sleeve 11 (FIGS. 3 and 6a) of electrical insulating material is slipped over each post 10 before the stator is lowered into the position shown in FIG. 5. As best seen in FIGS. 3 and 4, an enlarged aperture in the web of the base plate 6 is located between the posts 10, for receiving a bearing cup 14 integral with an insulating block 12. A ball bearing 15 (FIG. 3) on the rotor shaft fits into the bearing cup 14 of the block 12 thereby electrically insulating the plate and rotor.

Figure 5:
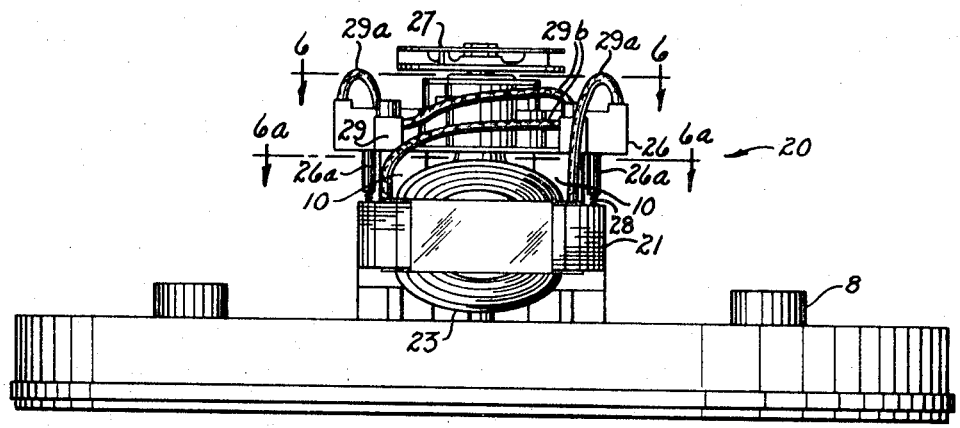
FIG. 5 is a side elevation of the motor unit mounted on the base plate shown in FIG. 3.
Figure 22:
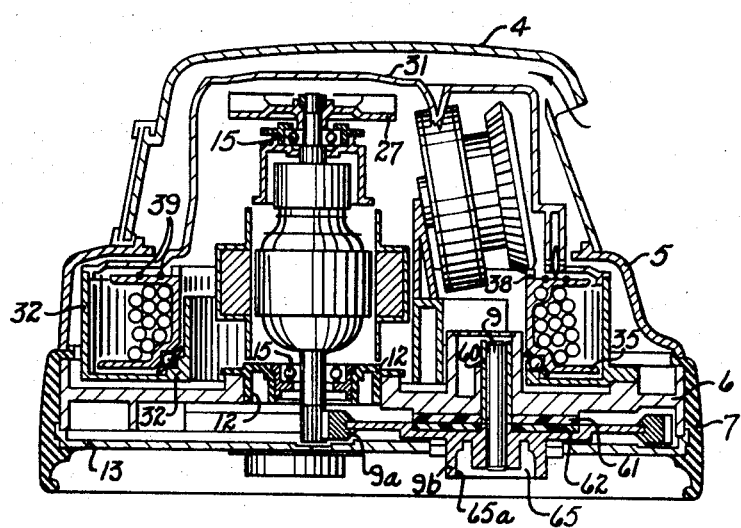
FIG. 22 is a cross-sectional view taken generally along line 22, 22 of FIG. 1 showing further assembly details of a floor care machine according to the invention.

As shown in FIG. 22 the rotor shaft extends through the base plate 6 and the splined end 25a of the rotor shaft meshes with one of the gears 9a. The other two gears are meshed in turn with the driven gear. The rotor, designated 25, is preferably pre-assembled with a detachable brush housing 26 (FIGS. 5 and 6) of insulating material. The housing 26 also contains a ball bearing for the upper end of the rotor shaft. A cooling fan 27 (FIG. 5) is attached to the end of the rotor shaft in any suitable manner. The rotor 25, including the assembled housing 26, is lowered into position within the stator 21 and the splined end of the rotor shaft is meshed with a gear 9a and the bearing 15 is seated in the bearing cup 14 of the block 12 as seen in FIG. 5. The motor unit is attached to the plate 6 by means of a number of screws (FIG. 3) which are passed through openings provided in the housing 26 and seated thereon, and enter into threaded bores in the posts 10. Since the stator is not attached to the base plate 6, the housing 26 is provided with a pair of hollow depending cylinders 26a having hold-down springs 28 depending from the cylinders and adapted to engage the stator (FIG. 5). The springs 28 are insulated from the brushes in housing 26 in any suitable manner for example by making the cylinders 26a only partly hollow. As shown in FIG. 5 one end of each stator coil wire is connected in known manner to a carbon motor brush (not shown) by a length of wire 29a. The other end of the wire of this coil is connected by a length of wire 29b to a cantilever support 29 of insulating material which extends from the housing 26 and is preferably integral therewith. The support 29 is formed with a U-shaped opening 29c (FIG. 6) defining a tongue 29d which fits into the end of the solderless connector tab 29e, which are shown detached in FIG. 6, in the same way as the male blade of such connectors are known to cooperate with the tab. As will appear hereinafter the coils 23 are electrically coupled with the cord of the cordwinder via the connectors 29e attached to the supports 29. In FIG. 6 the connectors 29e are not shown in position on the supports 29 for the sake of clarity, in practice the connector shown at the upper right portion of the figure is attached to the left hand support 29 and the lower left connector to the right hand support 29 as shown in FIG. 7.

When the motor unit 20 has been attached to the base plate, via housing 26 and posts 10 as noted above and shown in FIG. 5, the cordwinder unit generally designated 30 is lowered into position as indicated in FIG. 3 and attached to the base plate 6 by screws which are received in threaded fittings 9 (FIG. 4) in the base plate.

Figure 9:
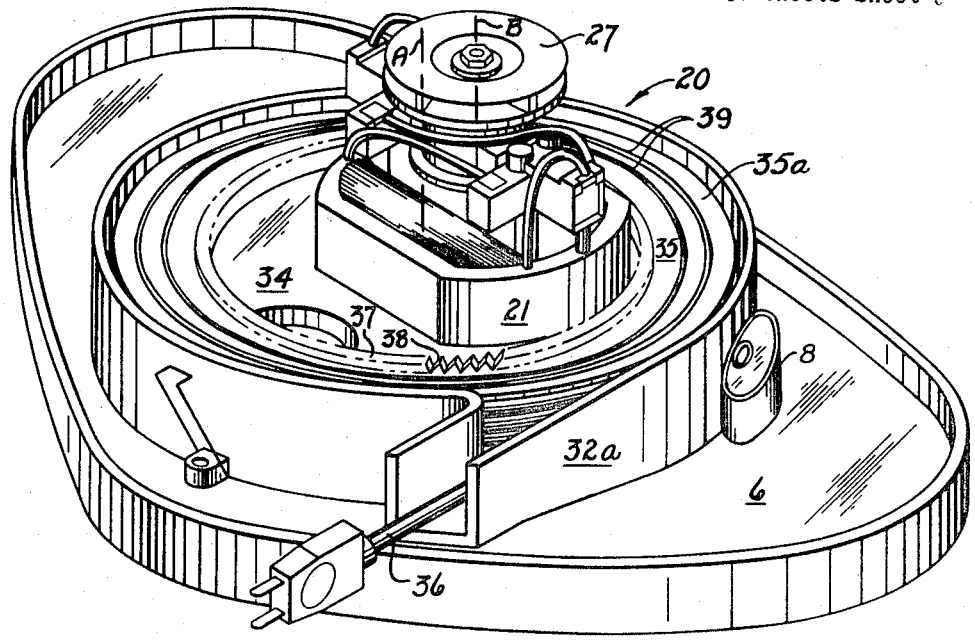
FIG. 9 is a perspective view similar to FIG. 7 with the addition of a cord reel in place within the cordwinder tray of FIG. 7.
Figure 10:
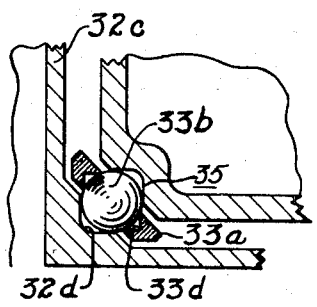
FIG. 10 is a detailed cross-sectional view of the ball bearing support for the cord reel within the cordwinder tray as seen in FIG. 9.
Figure 8:
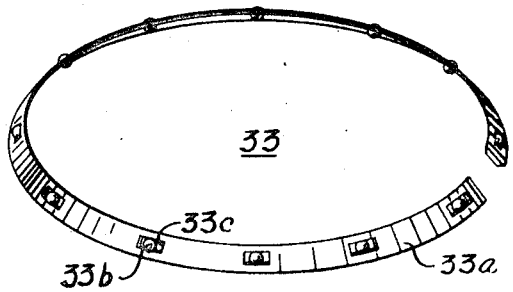
FIG. 8 is a perspective view of a ball bearing cage or retainer shown in its normal operative position within the cordwinder tray in FIG. 7.

FIG. 7 is a perspective view of the assembly shown in FIG. 5 with the addition of a cordwinder tray 32 of a cordwinder unit attached to the base plate 6. The cordwinder unit 30 consists of a number of parts described hereafter within a two part housing consisting of a cover 31 and the tray 32 as shown in FIG. 20. However, the tray 32 is the only part of the cordwinder unit shown in detail in FIG. 7. As described in connection with FIG. 3 the complete cordwinder unit 30 is assembled in one piece with the base plate 6 and motor unit 20 during actual manufacture. However, for the purpose of describing various features of the invention only the tray 32 is illustrated in FIG. 7. The tray 32, consisting of any suitable plastic material, comprises an outer peripheral wall 32a having a cord outlet opening 32b and in inner wall 32c between which an annular well is defined for receiving a cord reel 35 (FIGS. 9 and 11). The base of the inner wall 32c is filleted, as shown best in FIG. 10 for strengthening purpose and the fillet is recessed for defining the inner race 32d of a ball bearing generally designated 33 (FIG. 8). The ball bearing 33 comprises a ball retainer 33a and a series of spaced balls 33b held in the apertures 33c formed in the retainer. As shown in FIG. 10 the upper and lower walls of the retainer 33a defining apertures 33c are recessed at 33d so that the balls are held in the associated aperture but are free to rotate and move circumferentially. As seen in FIG. 8 the ball bearing retainer 33a is discontinuous for quick and easy assembly over the tray platform 34 and into position on the inner ball race 32d. The cordwinder tray 32 includes a platform section 34 upon which a spring motor (FIGS. 14–17) is mounted. The spring motor will be described in detail in connection with FIG. 10.

FIG. 9 is a perspective view of the assembly shown in FIG. 7 with the addition of a cordwinder reel 35 in the well of tray 32. The reel 35 (FIG. 17) has a pair of spaced radial flanges (only one is shown in FIG. 9) between which a length of electric cord 36 is wound. The reel 35 fits loosely in the well of the tray 32 and is supported on the ball bearing 33. As best seen in FIG. 10 the reel 35 is provided with an inwardly directed outer ball race 36. The tray 32 and the reel 35 are spaced from one another by bearing 33 and the weight of the reel 35 is born entirely by the ball bearing 33. As shown in FIG. 22 a number of spaced idler rollers 31a attached to the cordwinder cover 31 bears on the reel 35 at various locations to prevent rocking of the reel relative to the ball bearing. As seen in FIGS. 9 and 11 the hub portion 37 of the reel 35 projects above the upper flange 35a of the reel and provides a face type gear 38 having inclined teeth. That is, the teeth are inclined at an angle X (FIG. 11) to the radii of the hub and are beveled outwardly in a plane which defines an upright cone having its apex elevated above the gear 38 on the axis of rotation of the reel. It will be noted also that the axis of rotation A of the reel 35 is offset with respect to the axis of rotation B of the motor rotor 25b as shown in FIG. 9.

As best seen in FIGS. 11, 12 and 13 the flange 35a of the reel 35 carries a pair of spaced conductor rings 39 which are held in place on the flange 35a by snapping the ring into the configured recess 39a having opposed lips 39b. The lips are deformed by the ring as it is pushed into the recess and by properly dimensioning the recess 39a and ring 39 the lips 39b retain the ring 39 in the recess 39a. The cord 36 is attached to the rings 39 by a solderless connector 36a which are crimped onto an exposed conductor of the cord in known fashion. The connectors 36a are brought up through a pair of openings 35b in the flange 35 and the open semi-cylindrical portion of the connector is positioned in a cut out or recess 35c contiguous with the openings 35b. The semi-cylindrical portion 36a of the connectors 36 receive the associated ring when it is snapped in place on the flange as noted above.

Figure 14:
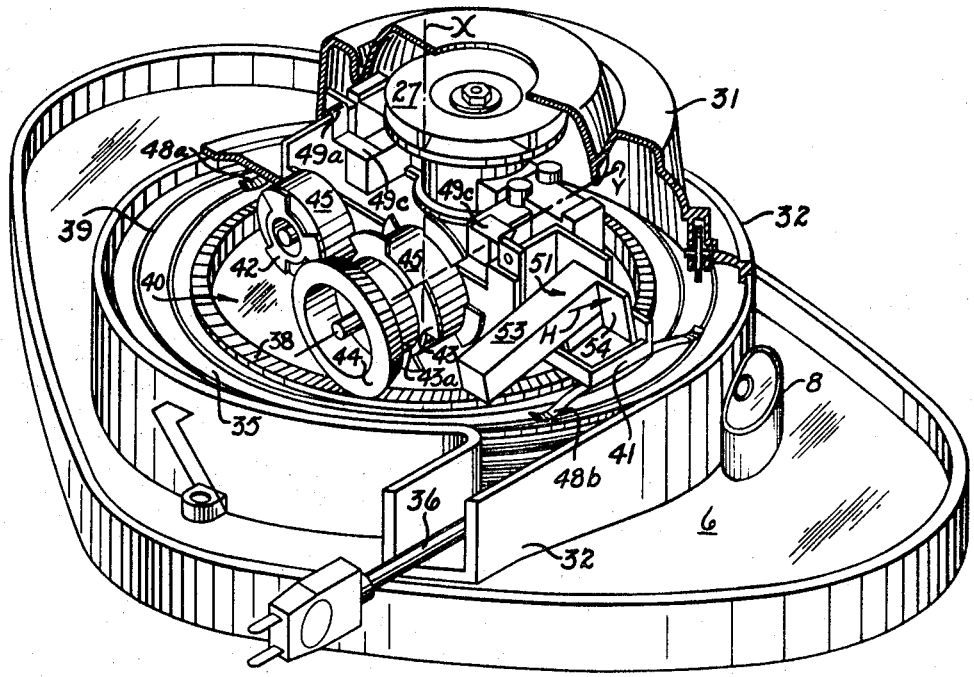
FIG. 14 is a view similar to FIG. 9 with the addition of a spring motor sub-assembly in operative position with the cord reel and cordwinder tray as seen in FIG. 9.
Figure 16:
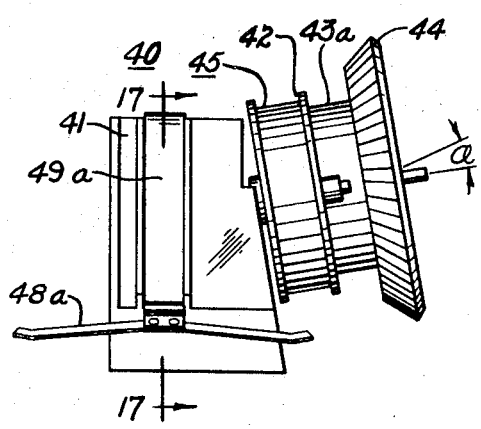
FIG. 16 is a side elevational view of the opposite end of the spring motor sub-assembly shown in FIGS. 14 and 15.
Figure 18:
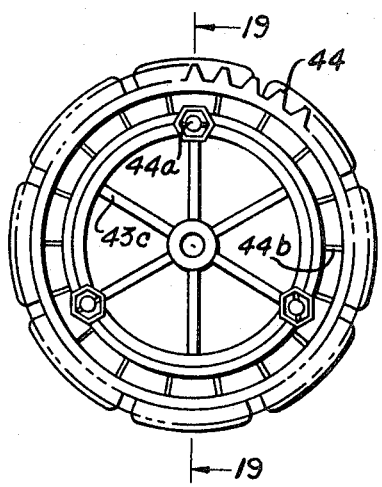
FIG. 18 is a front elevational view of the pinion of the spring motor sub-assembly seen in FIGS. 14 to 17.
Figure 19:
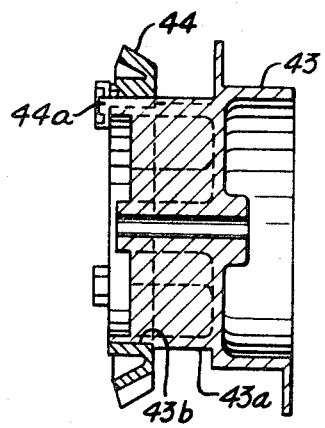
FIG. 19 is a cross-sectional view taken on line 19, 19 of FIG. 18.

FIG. 14 is a view similar to FIG. 9 in which a spring motor unit, generally designated 40, is shown in position relative to the cordwinder reel. As seen in FIGS. 14, 15, 16 and 17 the spring motor assembly 40 includes a horizontal U-shaped bracket 41 which is affixed to the platform 34 of the tray 32 (FIG. 7) in any suitable manner. The bracket 41, which consists of insulating material is suitably configured and ribbed for rigidity, and supports a take-up drum 42 and a driving drum 43 suitably journalled for rotation. The driving drum 43 has an axially extending hub portion 43a to which a pinion gear 44 is affixed to the hub portion 43a as shown in FIGS. 18 and 19 of the driving drum as shown in FIGS. 18 and 19. As indicated by center lines X and Y, in FIG. 3 the horizontal axis of rotation in vertical plane X of the pinion gear 44 is offset or skewed with respect to the vertical axis of rotation Y of the face gear 38 on the hub 37 of the cordwinder reel 35. The takeup drum 42 and driving drum 43 are closely adjacent to each other and the diameter of the take-up drum 42 is smaller than the diameter of the driving drum 43. A constant torque spring 45 for example the type known under the trademark "Neg'ator" of Hunter Spring Co., is spirally wound on the take-up drum 42 and one end of the spring 45 is attached to the driving drum 43 in any suitable manner. The teeth of the pinion gear 44 are beveled and mesh with the likewise beveled teeth of the ring gear 38 as indicated in FIG. 16. The ring gear 38 and pinion gear 44 define a skew axis gear train. That is, the axes of rotation of the meshed gears 38, 44 do not intersect and are non-parallel as illustrated by lines X and Y in FIG. 14. In addition the axis of rotation of the pinion gear 44 is inclined at an angle B (FIG. 15) to the horizontal. Further, the pinion gear 44 straddles the ring gear 38 since it is located in a plane forming a chord of the circle defiend by the ring gear and therefore the teeth of the ring gear 38 are beveled downwardly in a direction away from the axis of rotation of the ring gear i.e. the plane of the beveled ring gear defines an upright cone having its apex elevated above the gear 38 on the axis of rotation of the reel, and the pinion gear 44 is beveled to define a cone having its apex within the hub 37 of the reel 35. The teeth of both the ring gear 38 and the pinion gear 44 are inclined relative to their respective axes of rotation. By virtue of the skew axis gear train described above a compact spring motor drive for the cord reel having the necessary gear reduction (2:1) and low friction, smooth running gears is obtained.

In operation, as the electric cord is unwound from the reel 35 the spring 45 is wound up on the driving drum 43. A detent 46 (FIG. 17) is mounted on the bracket 41 concentric with the driving drum journal and engages a pawl or dog 47 pivotally mounted on the driving drum 43. The dog 47 influenced by gravitation locks the driving drum when the length of cord desired has been drawn from the reel and the detent recess is positioned to receive the pawl. When the detent is released the cord 36 is wound back up on the reel 35 which is now driven by the pinion 44 via the drum 43 and spring 45, the latter being taken up on the drum 42.

Figure 17:
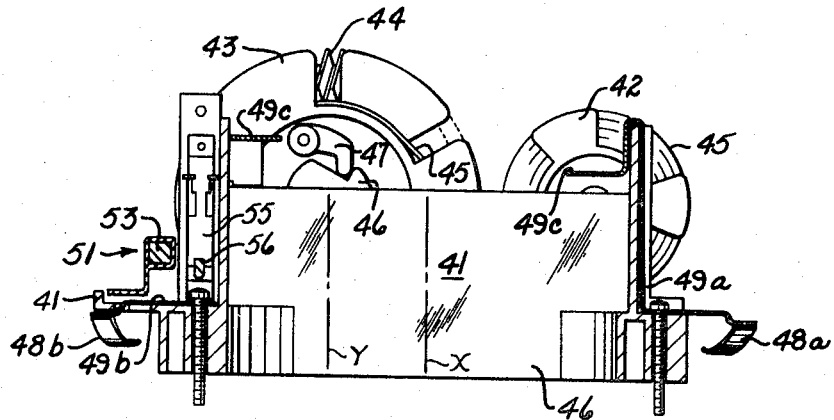
FIG. 17 is a partly sectioned rear elevational view of the spring motor sub-assembly shown in FIGS. 14, 15 and 16.

As shown in FIGS. 14, 15, 16 and 17 the bracket 41 of the spring motor assembly carries a pair of diametrically disposed spring contacts 48a and 48b that engage the slip rings 39 of the reel 35. Thus, one pair of spring contacts engages one slip ring 39 and the other pair engages the other slip ring 39. The spring contacts 48a and 48b are connected with the lead-in conductors strips 49a and 49b respectively each of which terminate in a pair of free ends 49c (FIGS. 14 and 17). When the cordwinder unit 30 and associated spring motor assembly 40 are lowered into place on the base plate 6 the free ends 49c of the lead-in conductor strips 49a, 49b make contact with the connectors or clips 29e (FIGS. 6 and 7) which are crimped to the ends of the coil conductors 29a, 29b as described hereinbefore and mounted on the extensions 29. As previously described the other end of the stator coils are connected with the motor brushes (not shown) in any suitable known manner. Thus the field coils 23 and motor brushes are electrically coupled by the clips 29e and the ends 49c of the conductive strips 49a and 49b.

Figure 15:
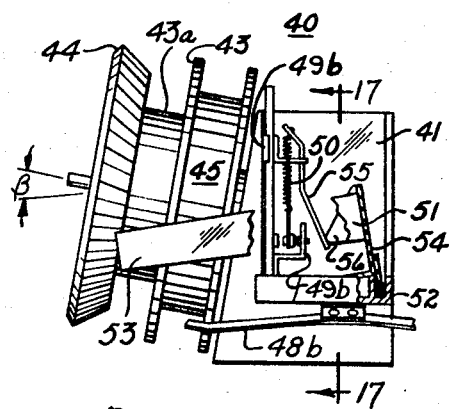
FIG. 15 is a side elevational view, partly broken away to show details of circuit units, including a switch, incorporated in the spring motor sub-assembly.

Referring more particularly to FIGS. 14 and 15 it will be seen that the circuit including lead-in conductor 49b from the electric cord 36 via slip rings 39 and contacts 48a, 48b includes a snap acting switch 50 having a weighted actuator generally designated 51. The switch 50 may be of any suitable known type. The actuator 51 is pivotally mounted on the bracket 41 for movement about an axis located at 52 (FIG. 15). The actuator comprises an elongated hollow body 53, filled with lead or some other heavy material terminating in a flange 54 at one end of the body 53. The flange 54 extends below the weighted body portion 53 and the lower end of the flange defines the axis of rotation 52 of the actuator. As a result of the just described arrangement the actuator 51 is positioned relative to the switch 50 by the force of gravity so that the switch is normally closed when the forces acting on the weighted body 53 hold it down as shown in FIGS. 14 and 15. In this position the actuator cam 56 (FIG. 15) pushes lever 55 so that switch 50 is closed. When the position of the base portion 2 of the floor polisher is positioned for changing brushes the flange 54 is pivoted by the weight 53 into a vertical plane in which position the cam 56 moves away from lever 55 and the switch 50 is opened by a spring attached to the lever 55.

The arrow H in FIG. 14 indicates a force applied to the flange 54 by a projection on the handle to open the switch 50 when the handle is in its vertical position. As a result the switch 50 is manually opened when the handle is in its vertical position and is automatically opened when the floor care machine is laid on its side for changing brushes and the handle is not positioned for opening the switch 50.

FIGS. 18 and 19 show details of construction of the driving drum of the spring motor in which the pinion 44 is formed as a discrete part and attached to the hub 43a of the driving drum 43 by means of a self threading nut of known type. The hub 43a is provided with an annular recess adjacent its free end for receiving the pinion and defining a shoulder 43b against which the pinion is axially positioned on the hub. A plurality of ribs 43c extend radially beyond the free end of the hub and terminate in posts 44a onto which the self threading nut may be attached to hold the pinion against shoulder 43b. Alternatively the posts 44a may be deformed by a hot tool for the same purpose, however the self threading nut is preferred since it allows removal of defective parts discovered in quality control and inspection. The pinion 43 may be hollow to provide radial resiliency if desired, or as indicated in FIG. 19 the pinion 43 may be rigidified by radially spaced ribs 44b.

Figure 21:
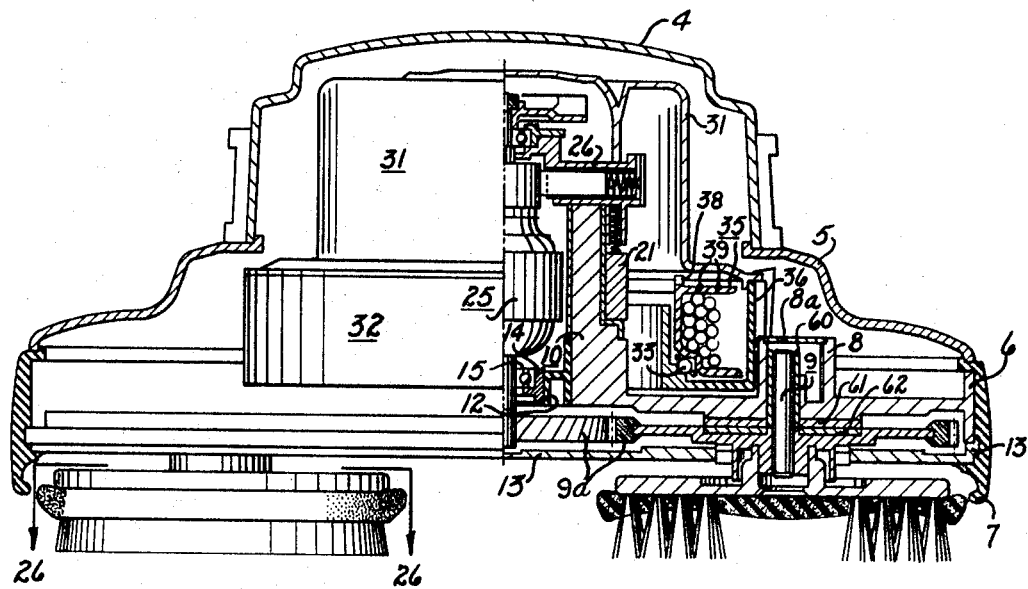
FIG. 21 is a partly cross-sectioned view of the completely assembled base unit of a floor care machine according to the invention and taken generally along line 21, 21 of FIG. 1.

The foregoing detailed description of the various parts of the floor care machine already described are shown in assembled relation in FIGS. 21 and 22 but further description thereof would be redundant and is therefore omitted. However, the thrust bearing supporting the weight of the machine relative to the rotating gear inserts 9a is shown in these figures and in greater detail in FIG. 23. Therefore reference is now made to FIGS. 21, 22 and more particularly to FIG. 23.

As previously noted the wells 8 contain a lubricant which is fed to the shaft 9 via a porous metal sleeve such as a sintered bronze bearing sleeve 60. The sleeve 60 extends through the base plate 6 into the plane of the interface between a pair of washers 61 and 62. The washer 61, is fixed in any suitable manner to the base plate 6. The washer 62, is fixed to the gear insert 9a and rotates with the gear insert. The lubricant from well 8 passes via the sleeve 60 into the interface between these two washers 61 and 62. It was found that the use of washers 61 and 62 one of which consists of Delrin and the other of nylon gives superior results (low friction) to the use in each washer of the same material (either nylon or Delrin). An explanation for these superior results is not known at present.

An alternative arrangement is to provide the oilite sleeve with a horizontal flange in place of the washer 61 and replace washer 62 with a steel washer. In the alternative arrangement the oilite flange and steel washer are of a smaller diameter than the plastic washers 61, 62.

In addition to the thrust washers 61, 62 in combination with a sintered sleeve 60. FIG. 23 also shows a labyrinth seal located between the splash plate 13 and the hub 9b of the gear insert which extends below the splash plate. The labyrinth seal consists of a cup-shaped member 63 fixed for rotation on the hub 9b. One leg of the member 63 fits loosely in the recess 64 formed in the splash plate 13.

Figure 25:
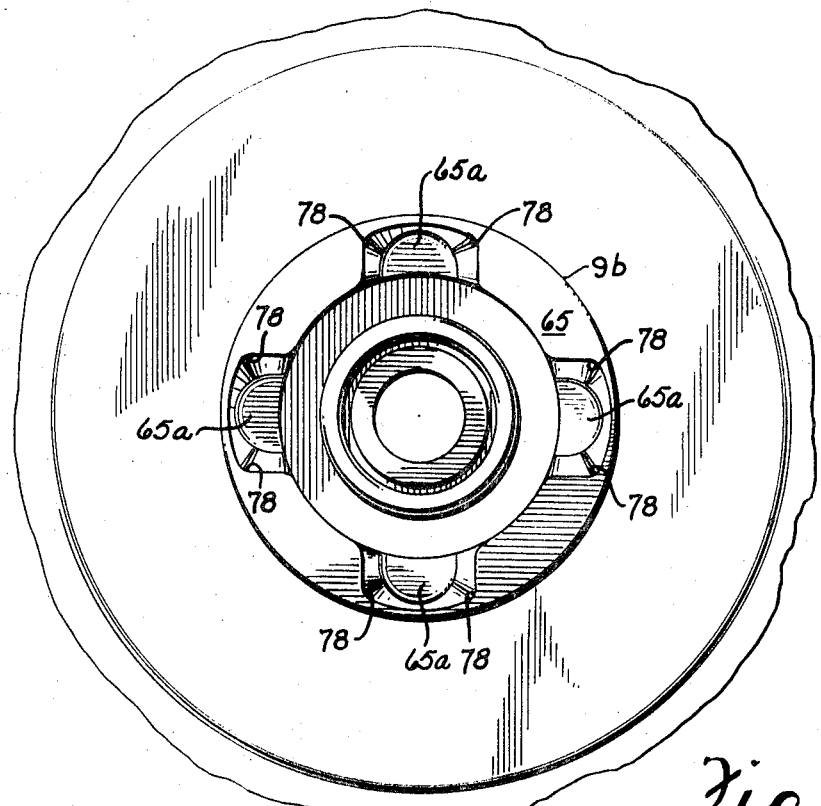
FIG. 25 is a partial plan view of the gear insert shown in FIGS. 23 and 24 and taken generally on line 25, 25 of FIG. 24.
Figure 26:
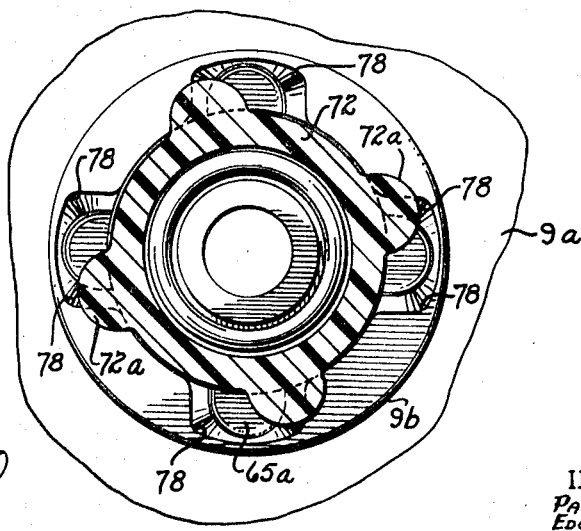
FIG. 26 is a schematic cross-sectional view illustrating the cooperating of the brush hub and gear insert for separating the brush from an associated driving hub of the gear insert.
Figure 27:
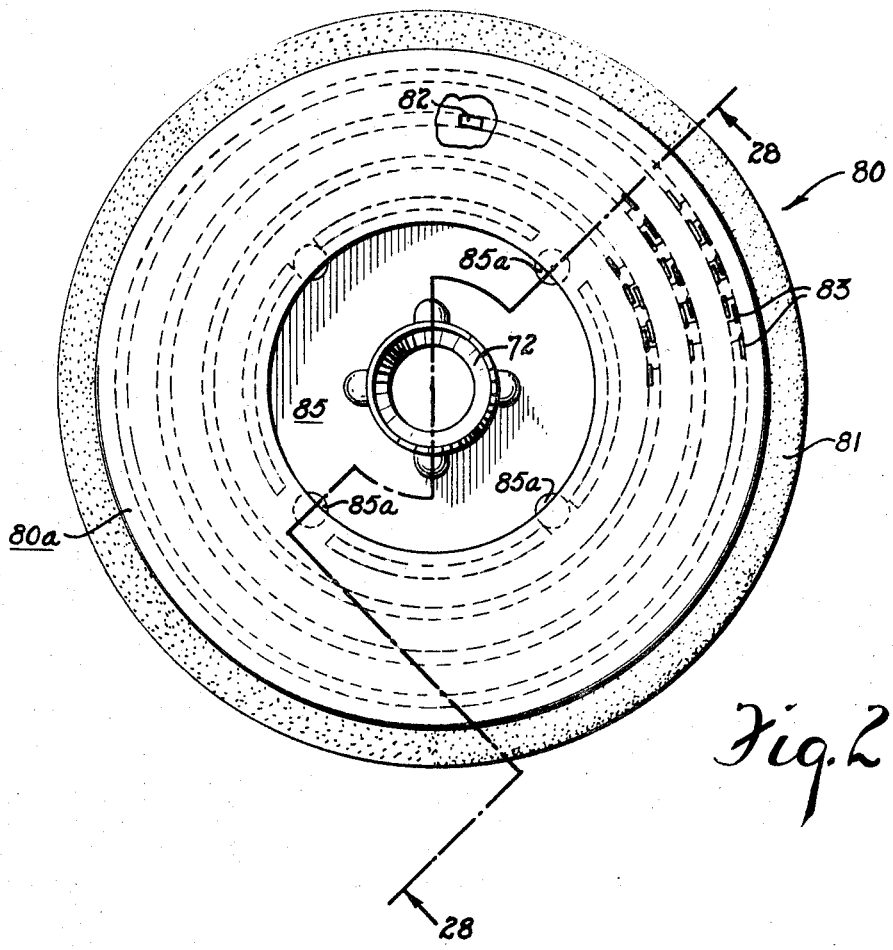
FIG. 27 is a top plan view of a foam generating brush according to the invention.

A brush latching arrangement according to the invention is illustrated in FIGS. 23 to 26. In accordance with this feature of the floor care machine, the gear hub 9b is formed with a configured recess 65, 65a adapted to receive the similarly configured hub of a brush generally designated 70. The brush consists of a brush back 71 to which the bristles are attached. The hub 72 of the brush is provided with driving lugs 72a, the lugs are received in radially extending recesses 65a of the gear insert hub 9b. That is, the driving lugs 72a of the brush fit loosely within the recesses 65a of the gear hub. Dimensions for these parts are chosen to allow some freedom of movement of the brush relative to the gear hub as indicated in FIG. 23 in order for the brush to follow the inherent unevenness of a floor. As seen in FIG. 24 the brush is held in place by a spring ring 76 attached to the lower end of the center post of the gear hub and an inwardly directed lip 73 on the brush hub. When dirt and oxidation accumulate on the ring 76 and within the hub 72 of the brush it becomes extremely difficult to pull the lip 73 past ring 76 by exerting an axial force on the brush. To overcome this the brush is turned clockwise or counter-clockwise relative to the gear hub (FIGS. 25 and 26). As the brush turns the rounded ends 72b of the lugs 72a engage a camming surface 78 adjacent to the lower end of each recess 65a of the gear insert 9b. As a result the brush is lifted on the surfaces 78 thereby pulling the lip 73 past the ring 76. The leverage force obtained by turning and camming the lugs 72a on surfaces 78 is much greater than the force required to axially pull the brush from the gear hub and overcome the increased friction due to dirt and oxidation.

FIGS. 27 to 30 illustrate a foam generating brush for use with the floor care machine used for rug shampooing. The foam generating brush is provided with a hub 72 as just described above for camming separation of the brush and its driver or gear hub. The foam generating brush generally designated 80 comprises a brush back 80a, a disc 81 of sponge material and a plurality of bristle tufts 80b.

The brush back 80a, of any suitable material, is provided with a number of rectangular recesses 82 for receiving wires 83. The bristles, formed in clusters, or tufts 84, are folded over the bight of a U-shaped wire 83. A wire 83 and tuft 84 of associated bristles is driven through the imperforate sponge disc 81 which is positioned adjacent the underside of the brush back 80a and into the recesses 82. The wires 83 may be embedded in the brush back 80a of suitable material or be bent over at the other side of the brush back as is known. The recesses 82 terminate in a circular opening 82a at the bristle side of the brush back thus forming a shoulder against which the tufts 84 are held by wires 83.

The brush back 80a is provided with an annular channel 85 surrounding the hub portion 72. The channel 85 receives liquid shampoo from a hose or conduit 86, the other end of which is connected to a shampoo bottle 99, FIG. 33. The bottle of shampoo and associated hose deliver liquid shampoo into channel 85 in the brush back. The shampoo liquid flows from channel 85 into the sponge disc 81 via a plurality of radially extending holes 85a which are located at the periphery of the channel 85 so that the liquid passes by centrifugal force into the sponge disc 81, entering the sponge adjacent to the inner boundary of the annulus formed by the bristle tufts. The liquid shampoo travels by capillary action, and under the influence of centrifugal force, to the outer periphery of the sponge disc. As the brushes rotate, the sponge discs attached thereto are compressed and expanded (FIGS. 31 and 32) so that a pumping effect takes place which causes agitation of the liquid to thereby generate foam. Also, since the liquid travels radially across the brush body from the inside out the bristles absorb some of the liquid which is foamed in the bristle tufts by agitation as each tuft moves over a rug.

Figure 28:
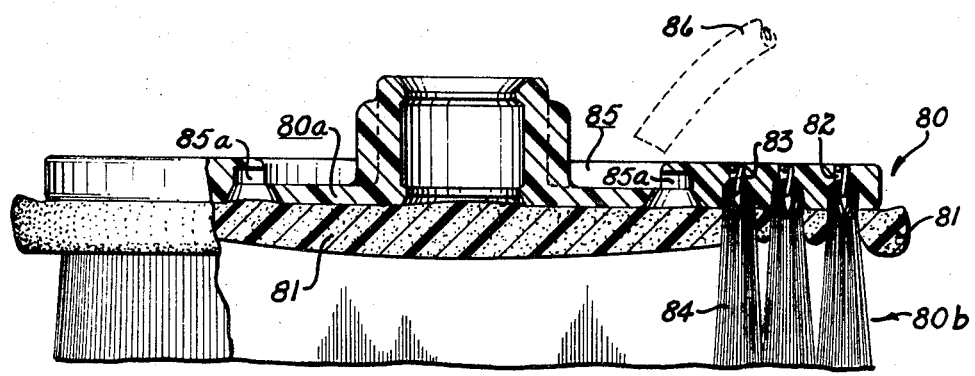
FIG. 28 is a partial cross-sectional view taken on line 28, 28 of FIG. 27.

In operation, as shown schematically in FIGS. 31 and 32 the foaming liquid may be fed to only one of two or three brushes, the liquid being deposited in the channel 85 (FIG. 28). The liquid passes under centrifugal force, into the sponge disc 81 via the holes 85a in the channel 85 and reaches the periphery of the sponge. As the brushes rotate the wetted sponge is compressed against the adjacent sponge disc as best shown in FIG. 31 thus agitating and aerating the liquid and the foam thus generated builds up within the brush well of the machine and is deposited on the rug (not shown). At the same time the liquid passes from one brush to the other. In a three brush device as illustrated in FIG. 31 liquid may be fed only onto brush 81a but it is transferred from brush 81a to brush 81b and then to the third brush 81c. Alternatively of course the liquid may be fed directly to each brush, however it has been found in practice that satisfactory foaming without wetting the floor covering being cleaned is obtained by supplying the liquid to only one brush and any excess liquid which would cause wetting is picked up by a sponge disc which does not have a separate supply of liquid.

Figure 38:
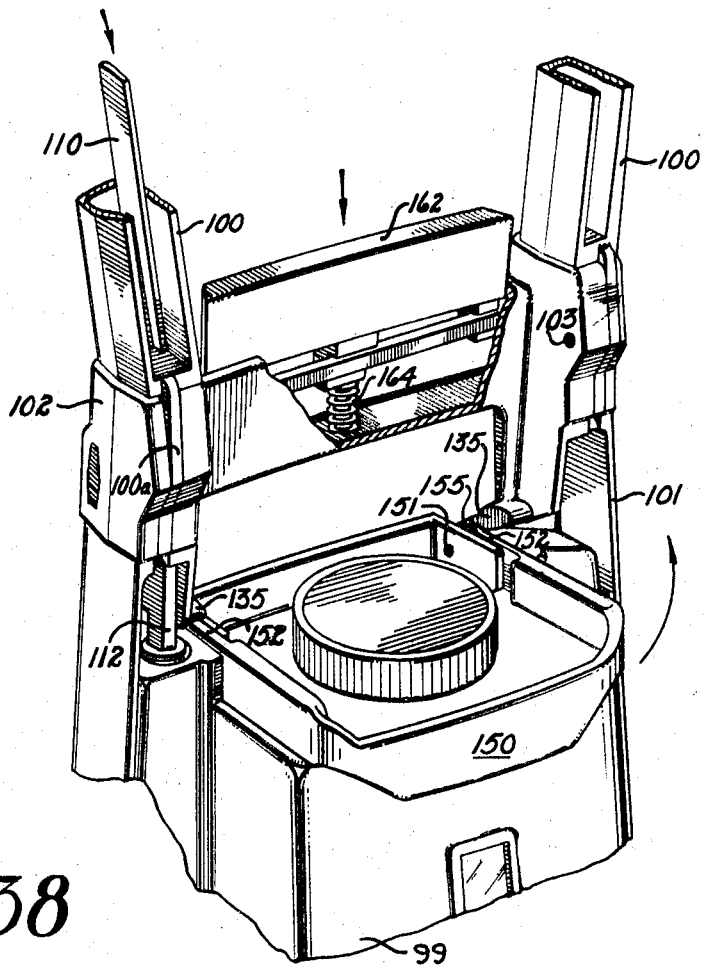
FIG. 38 is a perspective view illustrating the arrangement for holding and releasing a shampoo tank from the handle assembly.
Figure 39:
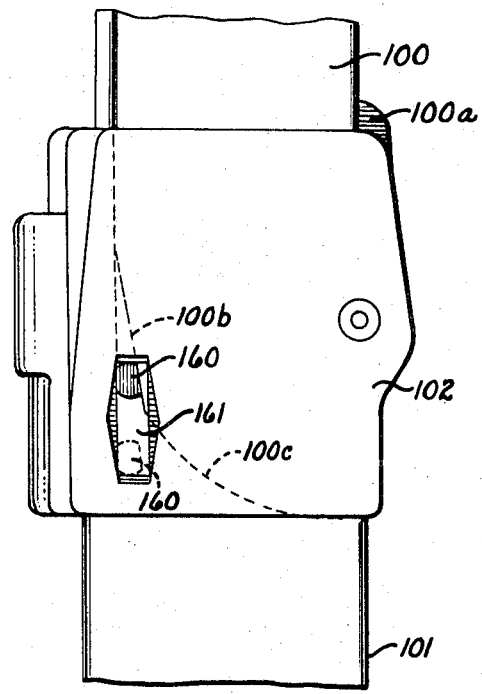
FIG. 39 is a side elevation on an enlarged scale of the articulated joint of the handle assembly which is partly broken away.

The articulated handle generally designated in FIG. 1 and FIG. 33, for guiding the base member 2 over a floor is shown in greater detail in FIGS. 33 to 40. The handle comprises an upper fork 100 and a lower fork 101. Each pair of legs or tines of the upper and lower fork members diverge from an intermediate yoke 102 which is connected to or formed integral with the lower fork. The upper fork is pivotally attached at a pivot 103 to the yoke 102 and the latching arrangement securing the upper fork in its extended position (FIG. 33) is best shown in FIGS. 38 and 39. The upper fork terminates in a pair of hand grips 104 integral with an intermediate piece 105. A shampoo dispensing control lever 106 and associated linkage is incorporated in one tine of the upper fork as seen in detail in FIG. 35. The lower fork is adapted to receive a shampoo tank 99 which is removably attached thereto as will be described in connection with FIGS. 36, 37 and 38.

FIG. 35 which is a cross-sectional view taken on line 35, 35 of FIG. 34 illustrates the shampoo dispensing linkage interconnecting the control lever 106 and a valve actuating rod 120 of the shampoo tank 99. The lever 106 is shown in a stowed or retracted position in the figure and when it is elevated about pivot 107 by movement in the direction indicated by the arrows to the horizontal position, the inner end 108 of the lever bears against a shoulder 109 of the push rod 110. The push rod 110 is held in position within the recess of the fork 100 in any suitable manner. The other end of push rod 110 is bifurcated at its lower end. One branch 110a of the bifurcated end of push rod 110 has a helical compression spring 111 concentrically surrounding it whereby the rod is urged upwardly so that the upper end of the push rod 110 engages a stop defined by the upper end of the tine recess as shown. In this position the branch 110b of push rod 110 is positioned in a retracted position within the tine 100. When the lever 106 is lifted the rod 110 is depressed and the branch 110b then projects beyond the end of the upper tine 100 into the yoke 102, thus depressing an intermediate motion translator 112. The motion translator 112 is urged upwardly within the yoke by a compression spring 113, in which position the top of the actuator is just flush with the associated surface of the yoke. As is apparent from FIG. 35 the translator 112 is moved downwardly by the branch 110b of the rod 110 when the lever 106 is lifted. The translator end 112a of the translator 112 is therefore moved into engagement with the valve actuator rod 120 of the shampoo tank 99 and moves rod 120 downwardly against spring 115 which normally urges the rod 120 upwardly. The lower end of rod 120 carries a valve 120a (FIG. 6) attached to the rod in any suitable manner and a valve seat 99a is formed integral with the tank 99. As a result the valve 120a is unseated when the lever 106 is lifted when in its extended position (FIG. 35) and the liquid in the tank flows into the mounting block 130 attached to the lower end of the tine 101. The mounting block 130 is provided with an opening which communicates the mounting block 130 with a tube 86. The tube 86 delivers the liquid shampoo to the foam generating brush as indicated in FIG. 28 in phantom. Alternatively the tube 86 may deliver liquid into a channel formed integral with the splash plate 13 (FIG. 3). In FIG. 3 reference numeral 13a identifies an upstanding hollow conduit, integral with the splash plate 13 and communicating with a channel (not shown) in the splash plate which conducts liquid to one of the brushes. The upper end of conduit 13a terminates in a suitable opening in the hood 5 as shown in FIG. 1. As shown in FIG. 1 the tube 86 remains in position when the tank 99 is removed since the mounting block 130 remains connected with the tine of fork 101.

As seen in FIG. 37 the mounting block 130 consists of a resilient synthetic resin formed by moulding. The tine 101 of the lower fork is generally U-shaped and is dimensioned to receive the mounting block 130 as shown in FIG. 37. The mounting block is held on the tine by a finger 131 having a recess which receives the projection 118 of the tine 101. The block is free to move in a longitudinal direction relative to the tine 101 between an upper stop and a lower stop provided on the tine (not shown). A mounting block on the other tine of the lower fork is identical to mounting block 130 with the exception that no provision is required for passing shampoo liquid through it.

FIG. 38 shows the upper end of the shampoo tank 99 held between the tines of the lower fork 101 by a pair of lugs 135. A handle 150 on the shampoo tank is pivoted at 151 and when the handle is lifted from the positon shown in FIG. 38 in the direction indicated by the arrow, the surfaces 152 of the handle engage the lugs 135 forcing the bottle downwardly thereby moving the mounting blocks against the compression spring 136 (FIG. 36) concentrically surrounding the spring pilot 137 (FIG. 37). When the shampoo tank is pushed down by the handle 150 to a determined degree the lugs 155 on the handle cooperating with the lugs 135, are free to slip past the lugs 135 and the tank 99 is withdrawn from between the tines of the lower fork. The tank 99 is placed on the fork by placing the bottom of the tank on the mounting pads and pushing it into the fork 101 until the lugs 155 slip past lugs 135.

Figure 40:
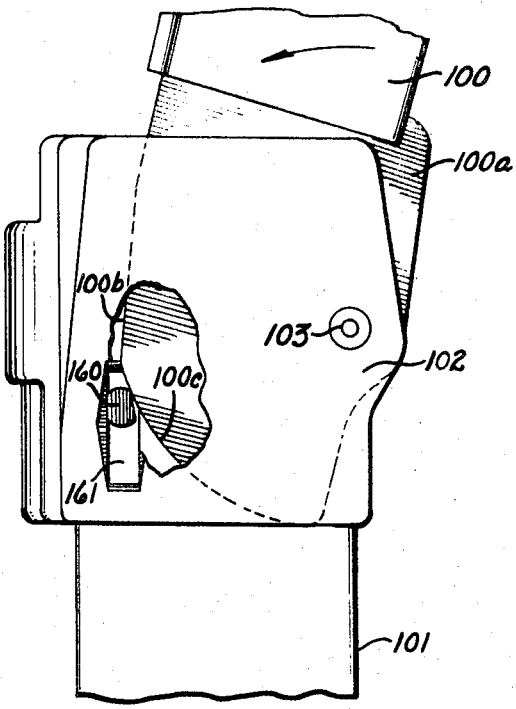
FIG. 40 is a side elevation similar to FIG. 39 showing parts in another position.
Figure 41:
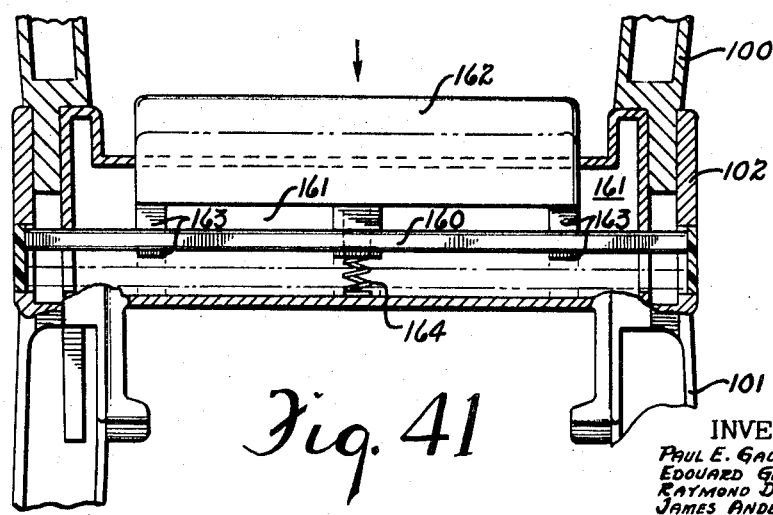
FIG. 41 is a cross-sectional elevation showing details of the latching arrangement according to FIGS. 38 and 39.

The latching arrangement for the articulated handle is shown in detail in FIGS. 40 to 42. As shown in these views each tine of the upper fork 100 has a configured ear 100a which fit in an appropriate slot in the yoke 102. The ears 100a have an inclined surface 100b and a curved surface 100c (FIGS. 40, 41). A bar 160 having a wedge-shaped cross section which is movable within a vertically elongated recess 161 lock the upper fork in its extended position, as shown in FIG. 40, when bar 160 is jammed between the yoke and the inclined surface of the ear 100a. When the release key 162 is depressed (in the direction of the arrow (FIG. 41)) the bar 160 moves from the position shown in section in FIG. 39 to the position shown in phantom lines, and the upper fork is free to turn about the pivot 103. When the upper fork is raised, as indicated by the arow in FIG. 41, the curved surface 100c of the ears 100a slide along the bar 160 until the upper yoke reaches a vertical position, then the key 162 is moved into jamming position, locking the handle in its extended position. It is noted that over extended periods of time the surfaces 100b and 100c of the ears 100a may wear, however, the upper yoke will be firmly locked in extended position nevertheless because the adverse effect of such wear will be offset by the bar 160 which will move a proportional distance upwardly in the recess 161. The bar 160 is connected with the release key 162 as best seen in FIG. 41. The release key 162 which slidably fits into a well in the yoke 102, has a plurality of depending legs 163 and the bar 160 is connected in any suitable manner with these legs. A light spring 164 urges the release key 162 and associated bar 160 in an upward direction as shown in these figures.

While we have shown a presently preferred embodiment of the invention, various modifications will be apparent from the teachings above. Therefore the scope of the appended claims is not intended to be limited to the specific details shown in the drawing and described above.

What is claimed is:

1. Apparatus comprising a base member, said base member having means for rotatably supporting a plurality of meshed gear wheels adjacent one of the major surfaces thereof, said base member having a pair of spaced parallel posts projecting from said base member in a plane substantially normal to the opposite major surface thereof, unitized motor means defining an axis of rotation located between said posts, said motor means being connected to said posts for driving one of said gear wheels through an aperture in said base member; a unitized cordwinder means including a tray member having an opening for receiving said motor means, said opening being offset with respect to the axis of symmetry of said tray member, means for connecting said tray member on said base member, a cord reel within said tray member, said cord reel defining an axis of rotation in spaced parallel relation with said axis of rotation defined by said motor means and substantially coextensive with said axis of symmetry, said cord reel having a hub, said hub having an annular beveled face gear, spring motor means mounted on said tray member, said spring motor means including a skew axis beveled pinion gear meshed with said face gear; means for electrically coupling said cord reel and said motor means, a housing member connected with said base member and handle means connected with said base member; means for removably attaching a brush member on said gear wheels.

2. Apparatus according to claim 1 wherein said unitized motor means comprises separable rotor and stator assemblies, said stator assembly including a core having pole pieces and field windings on said pole pieces, said core surrounding said posts and the rotor of said rotor assembly being positioned between said posts, said rotor assembly including a brush housing removably secured to the ends of said posts, means on said rotor assembly engaging said stator for maintaining said stator positioned on said posts in a vertical plane.

3. Apparatus according to claim 1 wherein said means for electrically coupling said cord reel and said motor means includes a switch means having a weighted actuator.

4. Apparatus according to claim 2 wherein said brush housing has a pair of outstanding supports projecting from said housing in the same direction adjacent each end of said housing, a U-shaped aperture in the upper surface of said supports defining a tongue in each said support, each of said tongues being adapted and arranged for receiving a solderless connector removably secured thereto; said solderless connectors being connected with the field windings of said stator; said means for electrically coupling said reel and motor being juxtapositioned with said solderless connectors on said tongue.

5. Apparatus according to claim 4 wherein said means on said rotor assembly engaging said stator for maintaining said stator in position relative to said posts comprises a pair of hollow cylindrical protrusions depending from said brush housing in the direction of said stator, and a helical spring seated in each said cylindrical protrusion for engaging the core of said stator.

6. A floor care machine according to claim 3 wherein said switch means includes a lever for opening and closing the contacts of said switch, a spring connected with said lever for normally biasing said lever to switch open position, a pivotal member having a cam projection engaging said switch lever, a weight connected with said pivoted member for maintaining said switch closed in the operating position of said apparatus, handle means for said apparatus, said handle means engaging said pivoted member for lifting said weight and opening said switch only in the vertical position of said handle; said weight closing said switch in the operative position of said handle and opening said switch when said apparatus is in a non-operating position.

7. Apparatus according to claim 1 wherein said last named means comprises a driving member having an axially extending hub portion connected with each said gear wheel, said hub portion having a configured recess extending axially thereof and including a radially outwardly offset groove, a camming surface on said hub portion contiguous with said groove; said brush member having an axial protuberance configured to fit within said recess including a lug adapted to fit within said groove, said lug having a camming surface complementary to the camming surface of said hub; means for locking said protuberance within the recess of said hub, said locking means being deformed when said camming surfaces are in abutment and moved relative to one another for separating said driven and driving members.

8. Apparatus according to claim 7 wherein the hub portion of said brush member includes an axially extending projection coaxial within said hub portion and defining the inner margin of said recess; said means for locking said protuberance within said recess comprising a lock ring on said hub projection extending into said recess, a radially inwardly extending lip on said protuberance adapted to engage said ring for preventing withdrawal of said protuberance from said recess; said lip snapping past said ring when said camming surface are in abutment and moved relative to one another.

9. Apparatus according to claim 8 wherein said protuberance and said recess are configured and dimensioned for allowing said brush member to pivot in order to follow the uneven contour of a floor.

10. Apparatus according to claim 1 wherein said unitized cordwinder means comprises an annular inner wall and outer wall interconnected by a bottom wall for defining an annular well, said outer wall having a cord channel outlet opening communicating with said well, an inwardly extending fillet at the intersection of said inner and bottom walls, said fillet having a recess for defining an inner ball race; said cord reel having a pair of radially extending spaced parallel flanges extending from a hub portion of said cord reel, an annular recess between said hub portion and one of said flanges for defining an outer ball race opposite said inner ball race, and a ball bearing interposed between said inner and outer ball races; said ball bearing having a frusto-conical ball retainer, said ball retainer having a plurality of angularly spaced apertures of rectangular configuration, a first pair of opposed surfaces defining each said aperture, a recess in each of said surfaces extending axially of said member for defining a pair of lips at each of said first surfaces, said lips being coextensive with said surfaces and adapted to receive and hold a ball therebetween, a second pair of opposed surfaces defining said aperture, said second surfaces being spaced apart a distance greater than the diameter of said ball for allowing the ball a degree of freedom of movement in one direction within said aperture; a face gear integral with the hub portion of said cord reel, and spring motor means having frusto-conical gear meshed with said face gear.

11. A cordwinder according to claim 10 wherein said spring motor gear meshes with said face gear in skew axis relation to said face gear.

12. A cordwinder according to claim 11 wherein the teeth of said face gear are straight and non-radial with respect to said hub and the teeth of said spring motor gear are straight and non-axial with respect to the cone of said spring motor gear.

13. A cordwinder according to claim 12 wherein said spring motor gear comprises a cylindrical hub portion having a take-up drum adjacent one axial end thereof, and a discrete rim having said teeth integral therewith connected adjacent the opposite axial end of said hub portion, said drum and rim being axially spaced from one another, and means for connecting said rim on said spring motor gear hub.

14. Apparatus according to claim 1 with the addition of a thrust bearing interposed between said base member and each of said gear wheels; the improvement comprising a first thrust washer of synthetic material and a second thrust washer of dissimilar synthetic material each of said thrust washers having a central aperture, means for mounting said washers in juxtaposition with said apertures being coaxial, a fixed porous metal sleeve having a bore received in the aperture of at least one of said washers and being coaxial therewith, a shaft connected with said driven member within the bore of said sleeve, a lubricant source for supplying a lubricant to said sleeve.

15. A thrust bearing according to claim 14 wherein said one of said thrust washer consists of "nylon" and the other of said thrust washers consists of "Delrin."

16. A thrust bearing according to claim 15 wherein said sleeve extends into said aperture at least to the plane of the interface between said first and second washers.

17. A thrust bearing according to claim 16 wherein said porous metallic sleeve consists of sintered bronze metal.

18. Apparatus according to claim 1 wherein said handle means comprises a handle member including a lower fork connected with said base member, a yoke joining the ends of said lower fork remote from said base member, an upper fork pivotally connected with said yoke at one end, a handle connected with the ends of said upper fork remote from said yoke, and means for releasably locking said forks in extended position; said releasable locking means including a channel in said yoke, a bar movably mounted in said channel, a pair of ears connected with said upper fork and coupled with said yoke, said ears having a curved surface extending into said channel and engaging said rod, an inclined surface coextensive with the said curved surface of said ears, said inclined surface and the adjacent surfaces of said channel defining a pair of wedge-shaped recesses for receiving said bar when said forks are in their extended position; and means connected with said bar for moving said bar out of said recesses.

19. Apparatus according to claim 18 wherein said bar has a wedge-shaped cross section.

20. Apparatus according to claim 19 wherein each of said forks converge toward said yoke.

21. Apparatus according to claim 18 with the addition of a shampoo tank, means for removably securing said tank on said lower fork between the tines thereof; said tank having an outlet therein normally closed by valve means and a rod connected with the valve means and projecting from said tank at the upper end thereof adjacent to one tine of said lower fork, a motion translator in said yoke adapted to engage the projecting end of said tank valve rod; a lever adjacent to the handle of said upper fork, said lever being pivotally mounted on the tine of said upper rod coextensive with the one tine of said lower fork when said forks are extended, a push rod movably connected with said coextensive tine engageably by said lever at one end and engaging said motion translator at its other end when said forks are in extended position, manipulation of said lever moving said push rod which in turn moves said motion translator to open the valve in said tank for discharge fluid shampoo from said tank.

22. Apparatus according to claim 21 with the addition of foam generating means in said base member, and conduit means connected with said tank for conducting shampoo to said foam generating means.

23. Apparatus according to claim 22 wherein said foam generating means comprises a plurality of scrubbing brushes each said brush having a brush back including first and second axially spaced surfaces, an annular recess in at least one of said brush backs opening into one of said surfaces, a sponge member fixed to each of said brush backs adjacent to the other of said surfaces, a plurality of bristle tufts securing said sponge members to each said brush back, channel means communicating said recess with said sponge member, said sponge members extending radially beyond the associate brush backs whereby said sponge members abut and are compressed against one another; said conduit means delivering liquid shampoo into said recess whereby said liquid shampoo wets the associated sponge member and is discharged from said sponge member as foam at the abutting and compressed portions of said sponge members.

References Cited

UNITED STATES PATENTS

| | | | |
|---|---|---|---|
| 3,203,707 | 8/1965 | Anderson | 15—49 X |
| 3,212,117 | 10/1965 | Ernstberger et al. | 15—50 |
| 3,216,035 | 11/1965 | Gaudry | 15—49 |
| 3,216,047 | 11/1965 | Ernolf | 15—385 |
| 3,275,760 | 9/1966 | Gaudry | 191—12.2 |

EDWARD L. ROBERTS, Primary Examiner

U.S. Cl. X.R.

191—12.2